United States Patent
Azenko et al.

(10) Patent No.: US 7,362,773 B2
(45) Date of Patent: Apr. 22, 2008

(54) DOCSIS 2.0 SCDMA CAPABLE SNIFFERS WHICH CAN CAPTURE LEGACY DOCSIS BURSTS AS WELL

(75) Inventors: Yehuda Azenko, Cupertino, CA (US); Selim Shlomo Rakib, Cupertino, CA (US)

(73) Assignee: Terayon Communications Systems, Santa Clara, CA (US)

( * ) Notice: Subject to any disclaimer, the term of this patent is extended or adjusted under 35 U.S.C. 154(b) by 1050 days.

(21) Appl. No.: 10/397,508

(22) Filed: Mar. 25, 2003

(65) Prior Publication Data
US 2004/0190544 A1 Sep. 30, 2004

(51) Int. Cl.
*H04J 3/26* (2006.01)
(52) U.S. Cl. ............... 370/432; 375/222; 375/327; 375/373; 375/376; 370/441; 370/503
(58) Field of Classification Search ............. None
See application file for complete search history.

(56) References Cited
U.S. PATENT DOCUMENTS
7,006,446 B1 * 2/2006 Anderson ............. 370/248
7,203,227 B1 * 4/2007 Currivan et al. ............. 375/222

* cited by examiner

*Primary Examiner*—Doris H. To
*Assistant Examiner*—Christopher P Grey
(74) *Attorney, Agent, or Firm*—Thelen Reid Brown Raysman & Steiner LLP

(57) ABSTRACT

A DOCSIS 2.0 compatible sniffer which can receive legacy DOCSIS 1.x TDMA bursts as well as DOCSIS 2.0 SCDMA bursts. One embodiment uses two cable modems in the sniffer, one to capture downstream data bursts and the other to capture downstream messages and to recover the downstream symbol clock and generate an upstream reference clock which is phase coherent with the recovered downstream symbol clock. The reference clock is used by a cable modem termination system to capture upstream SCDMA DOCSIS 2.0 bursts. DOCSIS 1.x TDMA bursts may also be captured. Other embodiments use a DOCSIS 2.0 compatible modem in the sniffer to lock onto a downstream, register as a cable modem in the system and capture downstream messages in order to derive the correct timing to generate control signals to control burst capture circuitry in the sniffer to capture DOCSIS 1.x and 2.0 upstream bursts. The digital samples of each burst can be sent digitally to the CMTS under test after some fixed delay or can be sent to the CMTS under test as an analog RF signal in repeater embodiments. This allows the CMTS under test to be simplified by pushing the burst capture circuitry out to the optical node.

32 Claims, 14 Drawing Sheets

UPSTREAM SNIFFER

UPSTREAM BURST SNIFFER/REPEATER

UPSTREAM BURST REPEATER

PRIOR ART DIGITAL RETURN UPSTREAM

DOCSIS 2.0 SCDMA CAPABLE SNIFFERS WHICH CAN CAPTURE LEGACY DOCSIS BURSTS AS WELL

FIELD OF USE AND BACKGROUND OF THE INVENTION

In cable modem systems, there is a need to be able to debug by capturing message and burst traffic in the upstream and downstream directions. In DOCSIS systems, there is a need to be able to capture all the data bursts, MAP and UCD messages, timestamp data, ranging request messages, ranging bursts, ranging response messages and all the other DOCSIS messages.

Sniffers exist in the prior art. A DOCSIS traffic sniffer manufactured by Filtronic-Sigtek, Inc. (model number ST260B) can captures data bursts and message traffic in DOCSIS 1.0 and 1.1 systems. However, DOCSIS 2.0 systems include the ability to send spread spectrum bursts, and the Filtronic sniffer cannot capture and demodulate spread spectrum bursts and time division multiplexed bursts at symbol rates faster than symbol rates of DOCSIS 1.0 and 1.1 systems. This device does not appear to be covered in any patents or published patent applications.

Conventional sniffers today are too complicated. It would be advantageous to have a simple DOCSIS 2.0 sniffer which can use a conventional DOCSIS 2.0 cable modem that has been modified to provide timing and control signals for a burst capture circuit that captures upstream bursts. It would also be advantageous to divert upstream bursts away from a CMTS and capture them in such a sniffer and provide such a sniffer with the capability to repeat captured bursts upstream so that only bursts and upstream messages are transmitted upstream and nothing else is transmitted. This could replace the digital return prior art where everything going upstream including empty minislots is digitized and sent upstream as digital samples. Both digital return systems in the prior art and a digital upstream sniffer/repeater allow the CMTS to not have any burst acquisition circuitry and only use digital signal processing circuitry to process the digital samples. This simplifies the CMTS. However, a digital sniffer/repeater which transmits upstream only bursts and messages allows greater consolidation of upstream traffic from different optical nodes and allows the CMTS to be used more efficiently.

Accordingly, a need has arisen for a sniffer which can capture all types of DOCSIS bursts including SCDMA DOCSIS 2.0 bursts in both the upstream and downstream. There has also arisen a need for a simpler DOCSIS 2.0 upstream only sniffer and a simpler DOCSIS 2.0 upstream only sniffer with repeater capability.

SUMMARY OF THE INVENTION

Two different classes of sniffers are described herein. The first class uses one or more DOCSIS cable modems in the sniffer to capture DOCSIS 1.0, 1.1 and 2.0 downstream bursts from the CMTS and to capture downstream messages from the CMTS to implement the DOCSIS protocols. The captured downstream messages include ranging invitations, ranging response messages which include time, frequency and power offsets and upstream equalization coefficients, and all the other downstream DOCSIS messages. Captured data from bursts and messages are transmitted by a local area network or other data path to a line card which includes a computer programmed to pass the data and messages to a personal computer coupled to the sniffer and to use data in the messages to do a self-ranging process and to control the upstream burst capture process.

The cable modem (CM) in the sniffer also recovers the downstream symbol clock and uses it to recover downstream bursts. If an upstream DOCSIS 2.0 burst is to be captured, the CM in the sniffer uses the recovered downstream clock to provide a phase coherent reference clock signal to a master clock generator. The master clock generator smoothes out jitter in the reference clock signal and multiplies the reference clock signal so as to generate a high speed reference clock signal. This high speed reference clock signal is coupled to a linecard which includes a CMTS receiver. The reference clock signal is used in the linecard to generate a 10.24 MHz local clock signal which is synchronized with the 10.24 master clock signal in the CMTS under test which drives the master timestamp counter. The 10.24 MHz local clock signal on the linecard is used to drive a local timestamp counter in the linecard and this keeps the linecard timestamp counter in synchronization with a master timestamp counter in the CMTS under test so that upstream minislot boundaries can be determined. The master timestamp counter counts ticks of the master clock in the CMTS under test.

An upstream minislot counter in the CMTS under test also counts the same 10.24 MHz master clock signal, and functions to count off the boundaries in time of the upstream minislots. The sniffer linecard also has an upstream minislot counter which is kept synchronized to the mininslot counter in the CMTS by counting the 10.24 MHz local clock signal and using captured DOCSIS 2.0 downstream timestamp snapshot messages to establish the correct relationship between the sniffer local timestamp counter and a local minislot counter and frame counter.

The local timestamp counter in the linecard is kept in synchronization with the master timestamp counter in DOCSIS 1.x and DOCSSI 2.0 advanced TDMA burst capture mode using timestamp samples which are included in captured downstream sync messages and captured timestamp snapshot messages in DOCSIS 2.0 systems. The local timestamp counter counts a free running 10.24 MHz clock, and differences between the timestamp count and the timestamp samples are used to generate error signals to adjust the free running clock frequency to minimize the errors.

In SCDMA mode in DOCSIS 2.0 systems, an upstream symbol clock is generated from the recovered downstream clock in captured downstream bursts. The upstream symbol clock in the sniffer CM is output at a reference clock output and is generated at a frequency which is M/N of the recovered downstream clock where the M and N factors are included in captured downstream messages when upstream DOCSIS 2.0 SCDMA bursts are to be captured. This DOCSIS 2.0 upstream symbol clock is phase coherent to the recovered 10.24 MHz downstream symbol clock in that it is locked into phase coherency with the recovered downstream symbol clock. Phase coherency means that for every M cycles of one clock, N cycles of the other clock will occur with simultaneous zero crossing at the end of the M cycle period, where M and N are both integers and both can be one. This upstream reference symbol clock is used by the sniffer linecard to capture DOCSIS 2.0 SCDMA bursts. In DOCSIS 1.x and 2.0 advanced TDMA bursts, the above described processing by the sniffer CM does not occur, and the CMTS receiver in the sniffer recovers the upstream symbol clock from the preamble and the data of the captured burst and uses that to recover the data in the data portion of the burst.

The CMTS receiver in the sniffer and an RF demodulator section and a field programmable gate array which includes a programmable delay element and an a programmable digital equalization filter, all are controlled by a programmed computer on a linecard in the sniffer.

The downstream messages transferred from the cable modems in the sniffer include the UCD messages that define burst and channel parameters such as symbol rate, frequency, modulation type, multiplexing type, etc. of each upstream logical channel. The downstream messages captured by the cable modems in the sniffer also include the MAP messages which define which upstream minislots will contain bursts from each cable modem under test. The captured downstream messages also include ranging response messages, each such message including the ranging corrections sent by the CMTS under test to a cable modem under test in response to an upstream station maintenance burst sent by the CM. The linecard captures upstream initial and periodic station maintenance bursts from cable modems under test and makes its own ranging correction calculations on each such burst. The ranging corrections in each ranging response message are subtracted from the ranging offset corrections (and upstream equalization coefficients in the preferred embodiment) calculated by the CMTS in the sniffer to derive difference values for the time, phase, frequency and power offsets (and difference values for the upstream equalization coefficients in the preferred embodiment). These difference values are calculated by the computer in the linecard and used to generate control signals to make corrections to circuitry of the line card in the RF demodulator and the FPGA delay and equalization filter coefficients in a process called self-ranging to get the linecard into synchronization with the upstream transmissions from a CM under test whose burst is to be captured. The CMTS in the sniffer then uses the locally generated upstream symbol clock, the upstream minislot count from its local timebase and data from captured UCD and MAP messages to control the circuitry in the sniffer to capture both DOCSIS 1.x and 2.0 bursts.

A second class of sniffers and sniffer/repeaters is characterized by: (1) the use of a slightly modified DOCSIS 2.0 cable modem in the sniffer which registers with the CMTS as one of the CMs in the system so as to capture the system timing of at least one upstream; and, (2) a burst capture line of circuitry which tunes, filters, amplifies and digitizes upstream bursts to be captured and stores samples of each burst in a buffer. In some embodiments, the burst capture circuitry includes a programmable passband filter for precise passband tuning based upon symbol rate and decimation circuitry to reduce the number of samples of lower symbol rate captured bursts.

Timing for the burst capture circuitry is supplied by the cable modem in the sniffer which synchronizes to the upstream on which the bursts to be captured will be transmitted and also captures the downstream UCD and MAP messges that define the timing and burst characteristics of every burst to be captured. Since the sniffer's cable modem is locked onto the same downstream as all the other cable modems in the system, it also has its local upstream timestamp, minislot and frame counters synchronized to the corresponding counters in the CMTS under test for DOCSIS 2.0 SCDMA bursts. This is done by recovering the downstream symbol clock and generating an upstream symbol clock at a frequency which is M/N the frequency of the recovered downstream clock and which is phase coherent with the master 10.24 MHz master clock in the CMTS under test. Captured downstream sync and timestamp snapshot messages are used to initialize the local timestamp counter in the CM and to establish the correct relationship between the local timestamp counter and the local minislot and frame counters for 2.0 SCDMA burst capture.

In DOCSIS 1.x and DOCSIS 2.0 advanced TDMA burst capture mode, the timestamp, minislot and frame counters are kept in synchronization using the same timestamp samples from the sync messages as in the case of all the other cable modems in the system. Every cable modem in the system uses the same free running upstream clock frequency to drive the local timestamp counter in DOCSIS 1.x and DOCSIS 2.0 advanced TDMA burst transmission mode. Every CM in the system on a given upstream in 1.x mode, including the CM under test, use the same sync messages in the linked downstream to keep their local upstream timestamp counters synchronized with the master timestamp counter in the CMTS. Therefore, each cable modem in the system will be using the same timestamp counter counts to determine the boundaries of the upstream minislots at the location of that cable modem. Therefore, the cable modem in the sniffer will be able to tell when each upstream minislot is occurring at its location and can use the copies of the captured downstream MAP data to determine which minislots to enable the burst capture circuitry and can use the pertinent UCD message data to control the burst capture circuitry to capture the burst. In some embodiments, the symbol rate data in the UCD message data can be used to control a digital passband filter in the burst capture circuitry to have the proper passband bandwidth to tune out RF signals outside the bandwidth of the burst to be captured.

The only modificiations that need to be made to the cable modem's software in this second genus of sniffers is to use the MAP and UCD data to generate suitable control signals to control the burst capture circuitry to capture upstream bursts at the proper times. In some embodiment, modifications must also be made to receive user input defining which bursts to capture. In other embodiments, no such modication to receive user input need be made since the sniffer captures all upstream bursts.

In alternative embodiments within this genus, the captured bursts are transmitted upstream from the buffer in the sniffer to a CMTS that has no burst capture circuitry. This embodiment for a sniffer/repeater can be advantageously used to replace the prior art digital return data paths by capturing only the upstream bursts and digitizing them instead of digitizing every minislot including empty one like the digital return technology. In this way, more efficient use of the CMTS can be made, and more optical nodes can share one CMTS receiver. This is because only the bursts are sent upstream so the CMTS can pipeline process burst after burst and need waste no time on processing samples of empty minislots.

DETAILED DESCRIPTION OF THE PREFERRED AND ALTERNATIVE EMBODIMENTS

Figure 1:
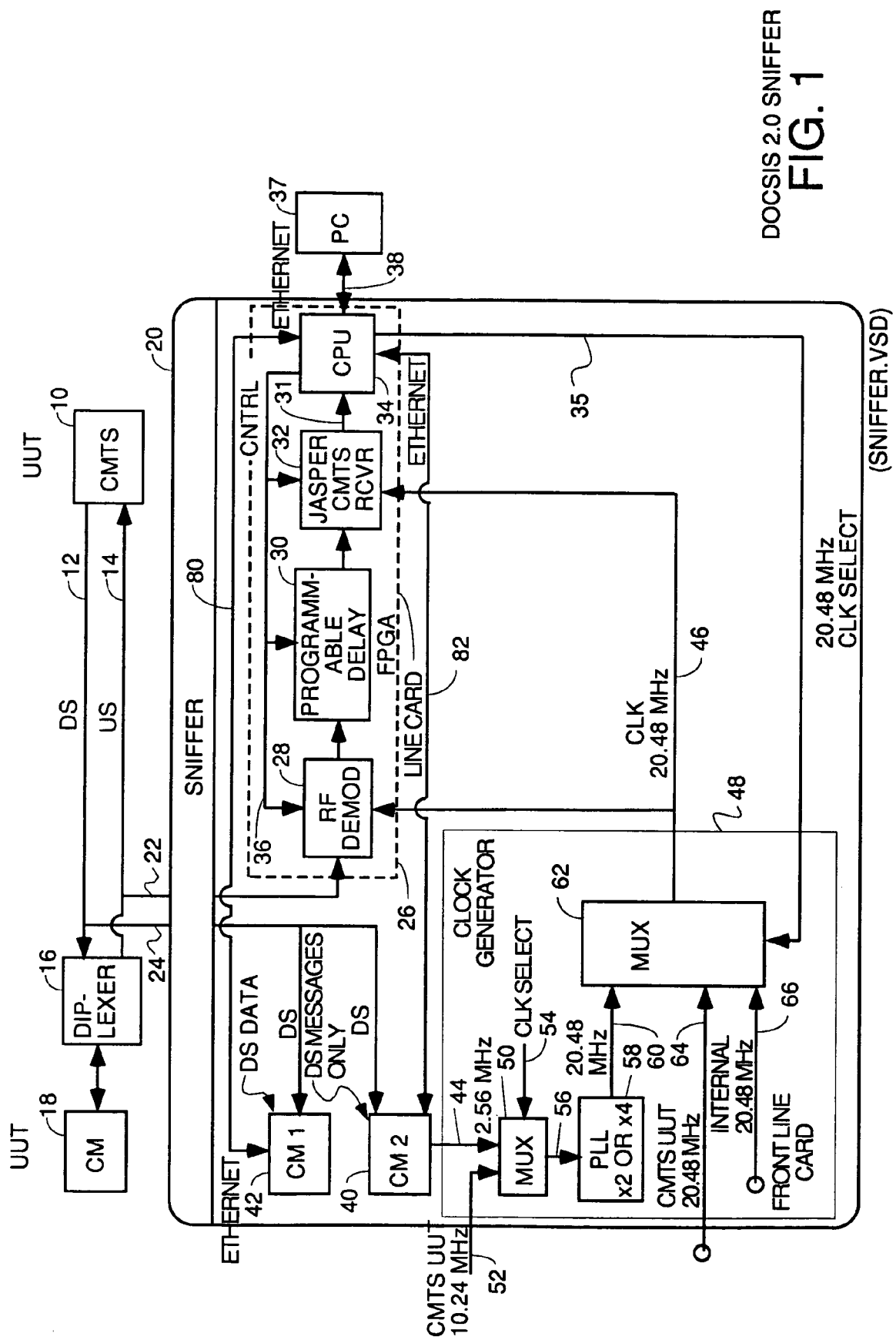
FIG. 1 is a block diagram of a system in which a DOCSIS 2.0 sniffer with two internal cable modems is employed to capture both downstream traffic where one cable modem captures all downstream message traffic and the other cable modem captures downstream data bursts, and a linecard is used to capture upstream bursts from the CM under test.

FIG. 1 is a block diagram of a system in which a DOCSIS 2.0 sniffer with two internal cable modems. Different parts of the sniffer are employed to capture both upstream and downstream traffic. A cable modem termination system (CMTS) 10 is one of the units under test. It transmits DOCSIS 1.0, 1.1 or 2.0 data bursts and messages downstream on a downstream medium 12. The CMTS 10 also receives upstream DOCSIS 1.0, 1.1 or 2.0 data bursts and messages from a cable modem 18 via upstream medium 14. The upstream and downstream mediums are coupled by a diplexer 16 to a plurality of cable modems (CM) of which CM 18 is typical.

A DOCSIS 2.0 sniffer 20 is coupled to the downstream and upstream mediums by taps 24 and 22 via splitters (not shown). The upstream tap 22 is coupled to a linecard 26 which includes an RF demodulator 28, a field programmable gate array (FPGA) 30 including a programmable delay circuit and a programmable digital equalization filter and a clock management circuit (block 30 can be implemented as an FPGA, an ASIC or in random logic), a CMTS receiver 32 and a programmed computer 34. The RF demodulator 28 can have the structure of any RF demodulator in a CMTS front end which can be controlled by CPU 34 to tune the appropriate upstream logical channel, convert that frequency to a lower intermediate (IF) frequency, amplify the received signal by a programmable gain, filter out unwanted signals and digitize the IF signal. Several suitable structures are disclosed in U.S. patent application Ser. No. 09/792,815 filed Feb. 23, 2001, which is hereby incorporated by reference. The FPGA 30 imposes a programmable delay controlled by CPU 34, and filters the signal in a digital equalization filter which has its coefficients controlled by CPU 34. The CMTS 32 can be any CMTS receiver, and CPU 34 can be any programmable computer which is programmed to control the linecard in accordance with the teachings herein.

The linecard 26 can be structured as any CMTS receiver upstream line card with some software modifications and some modifications to the FPGA. Only one channel of the conventional linecard need be used. Those modifications to the conventional linecard hardware and software are as follows:

(1) receiving the TLVs (data elements) of UCD and MAP messages captured by the cable modem 40 or 42 in the sniffer and converting them to the proper format and enabling searching MAP messages for the minislot numbers of upstream bursts to be captured and determining the burst parameters from the UCD messages of bursts to be captured, and capturing upstream DOCSIS bursts designated by a control computer and transmitting at least the data from said captured bursts to said control computer via a port on the sniffer—a TLV is a tuple with the first byte indicating the type of the data element, the second byte indicating the length, and the third part indicating the value;

(2) in mixed mode when two or more logical channels are being received in the upstream direction, combining the MAP messages for each logical channel into one MAP message for use by a Jasper type CMTS receiver 32;

(3) differentially encoding preamble symbols of DOCSIS 1.x differentially encoded bursts before they are loaded into a Jasper type CMTS receiver 32 (Jasper type CMTS receivers use a different preamble pattern than the CMs under test in differentially encoded bursts, but this modification can be eliminated if CMTS receives that use the same type preambles as the CMs under test for differentially encoded and non differentially encoded bursts);

(4) receiving the ranging corrections directed to each CM under test from the CMs in the sniffer and using the corrections sent to the CM under test along with the ranging corrections calculated in the CMTS receiver in the sniffer from captured upstream training bursts to get the CMTS receiver in the sniffer in time synchronization with the selected upstream;

(5) sending control messages to the cable modems in the sniffer to control which downstream bursts the CMs capture via the local area network segment coupling the linecard to the CMs 40 and 42 or via any other data path;

(6) performing all the other functions of the self ranging processes described below in the self ranging section including power corrections and setting of upstream equalization coefficients in the sniffer equalization filter so as to correct for the possibly different position on upstream HFC medium 14 from the CMTS 10 under test so as to enable proper reception of upstream bursts from CMs which have implemented ranging corrections based upon ranging response messages sent from CMTS 10 under test;

(7) interfacing via a LAN segment or any other data path with the personal computer 37 to send captured data and messages to it and to receive control commands therefrom indicating what upstream and downstream bursts to capture and/or any other control information needed to control the sniffer operations;

Any linecard with a CMTS receiver which has been modified in any way to have at least the functionality of items 1, 4, 5, 6 and 7 above and which is capable of receiving at least upstream DOCSIS 2.0 bursts will be referred to in the claims as a "sniffer upstream receiver" which is generally synonymous with a conventional upstream linecard modified according to the teachings herein. In the preferred embodiment, the CMTS receiver has the flexibility to receive any of the different burst types specified in the DOCSIS 1.X or 2.0 specifications. There are 15 different SCDMA and TDMA burst types at various symbol rates and modulation types that are predefined in the preferred embodiment, and each has a different IUC. Each burst has burst parameters, and the channel upon which the burst is transmitted has channel characteristics. The burst parameters and channel characteristics for each channel and each burst and the minislot numbers assigned to each upstream burst are controlled by the CMTS under test 10 and are sent downstream in UCD and MAP messages which are captured by cable modem 40 and transferred to computer 34. The MAP messages and burst parameters and channel characteristics define what type of bursts are going to be received during each upstream minislot.

The transmission characteristics of each logical channel are separated into three portions: 1) channel parameters; 2) burst profile attributes, and 3) user unique parameters. The channel parameters include: a) the symbol rate which can be any one of 6 different rates from 160 ksym/sec to 5.12 Msym/sec in octave steps; b) the center frequency; and c) the 1536-bit preamble superstring; and d) the SCDMA channel parameters. These characteristics are shared by all users on a given channel. User unique parameters may vary from user to user even when on the same channel and same burst type and include such things as power level. The power level of each CM is controlled by the CMTS so that bursts arrive at the CMTS at a nominal power level defined by the CMTS. Each CM must generate each burst at the appropriate time so that the beginning of the burst arrives at the CMTS at the assigned first minislot boundary specified in the MAP message. The burst profile attributes, in the preferred embodiment, include: modulation (QPSK, 64 QAM, 128 QAM etc.), differential encoding on or off; Trellis Code Modulation (TCM) encoding on or off; preamble length, preamble value offset; preamble type (QPSK 0 or QPSK1), RS error correction T from 0 to 16 where 0 is no FEC bits to 16 for the maximum where the number of codeword parity bytes is 2xT, RS codeword length (fixed or shortened), scrambler seed, max burst length in minislots, guardtime from 5 to 255 symbols for TDMA channels and 1 for SCDMA channels, last codeword length, scrambler on or off, byte interleaver depth, byte interleaver block size, SCDMA on or off, codes per subframe, and SCDMA interleaver step size. In other embodiments, any smaller set of the above defined programmable burst parameters may be used so long as the receiver can receive both TDMA bursts and SCDMA bursts.

The burst parameters and the MAP messages and channel characteristics are stored by the computer 34 in a burst parameter memory in CMTS receiver 32 via data path 36 by a MAC process running in computer 34.

The RF demodulator section 28 is a conventional RF demodulator section which is controlled by computer 34 to tune to an upstream channel specified in control signals or data on bus 36. The RF demodulator 28 also: filters out unwanted signals outside the bandwidth of interest; amplifies the signal by a programmable gain amount in accordance with control signals on bus 36; converts the RF signal of the band to which the RF demodulator is tuned to an intermediate frequency (IF) using a programmable frequency local oscillator signal the frequency of which is controlled by said computer 34 via control signals on bus 36, and converts the IF signal to digital samples using a sample clock which has a frequency high enough to meet the Nyquist criteria for the highest sample clock of any type burst which may be received. Any RF demodulator circuit, implemented in either analog or digital circuitry, which can fulfil these functions will suffice to practice the invention. All CMTS receivers which are commercially available use RF demodulator sections which perform these functions, and any one of them may be used.

One example of an RF demodulator section 28 is a programmable gain amplifier which amplifies the received radio frequency signals by a programmable gain amount. The output of this filter is filtered in a bandpass filter having a broad passband covering the entire upstream band of frequencies. The filtered output signal is mixed with a local oscillator signal having a programmable frequency to mix the RF signal down to an IF frequency at the center frequency of a more narrow passband bandpass filter with sharp rolloff skirts (typically a surface acoustic wave filter). The IF signal is then filtered in the narrow passband filter having a passband bandwidth which may be programmable in some embodiments to the bandwidth of the actual burst to be received based upon its symbol rate or which may be set at the bandwidth of the highest symbol rate burst to be received. The filtered signal is then digitized in an analog-to-digital converter which, in some embodiments, does IF sampling.

Another example of an RF demodulator section 28 is a programmable gain amplifier which amplifies the received radio frequency signal by a programmable gain controlled by computer 34. A bank of bandpass filters, each with a different center frequency and a bandwidth equal to the highest symbol rate channel to be received share an input coupled to the output of the programmable gain amplifier. A multiplexer having one input coupled to the output of each bandpass filter and an output coupled to an analog-to-digital converter is controlled by the computer 34 to pick the RF channel to be received. The A/D converter digitizes the selected filtered signal and the digitized sample stream is duplicated and mixed digitally with two quadrature local oscillator signals of the same frequency but 90 degrees out of phase (or some odd harmonic of 90 degrees) and represented in digital form. The two quadrature sample stream are then decimated and filtered in a decimation and filter circuit which decimates and passband filters with a bandwidth set according to the symbol rate of the burst to be received so that excess samples are removed and the passband bandwith matches the bandwidth of the burst to be received to eliminate more noise.

Another example of an RF demodulator is a low resolution synthesizer which amplifies the received RF signal by a programmable gain and down converts the RF to an IF frequency of approximately 5.12 MHz with the local oscillator frequency controlled by computer 34. An A/D converter then digitizes the IF, and a numerically controlled digital synthesizer then down converts the digital IF to an exact IF frequency of 5.12 MHz. The computer 34 controls the local oscillator frequency using the frequency offset measurement developed during the self ranging process.

Another example of an RF demodulator is a programmable gain amplifier applying a programmable gain controlled by computer 34 and broadband passband filter and analog mixer with the local oscillator frequency generated by the synthesizer controlled by computer 34 to generate an analog IF signal. The analog IF signal is then filtered by a SAW filter with a narrow passband at a center frequency of the IF and a bandwidth set to match the bandwidth of the burst to be received. Another down converter fed by a fixed frequency local oscillator then lowers the IF frequency further. A low phase noise bandpass filter then filters the new IF frequency signal, and an A/D converter digitizes the result.

Function of the Sniffer CMTS Receiver

Any CMTS receiver design will suffice for CMTS receiver 32 especially one which supports any preamble pattern for upstream bursts. A short summary of the overall function of CMTS 32 is that it functions to receive the digital samples output by FPGA 30 and process them in the signal processing section of the CMTS receiver 32 to make measurements on training bursts and output those ranging corrections to CPU 34, and to recover the data of data bursts and upstream messages and output the recovered data, ranging and upstream messages to CPU 34 for transfer to computer 37.

U.S. patent application Ser. No. 09/792,815, filed Feb. 23, 2001 details structures for various CMTS receiver embodiments, any one of which may be used for the CMTS 32 in the sniffer. CMTS receivers of the type detailed in U.S. patent application Ser. No. 09/792,815 will be referred to herein as Jasper type CMTS receives.

In one embodiment, a programmable digital filter in field programmable gate array 30 functions to add a programmable transfer function which imposes a delay and gain offset correction to get the CMTS receiver 32 in synchronization to receive upstream bursts. The amount of correction is controlled by filter coefficients which are controlled by CPU 34. In other embodiments, each of the time, phase, frequency and gain offsets is corrected by a separate circuit or a rotational amplifier is used to make gain and phase offset corrections, and a programmable delay circuit is used to make the timing offset correction and a programmable digital equalization filter is controlled to do upstream equalization. The digital equalization filter in FPGA 30 is a 24-tap feedforward filter with programmable taps in the preferred embodiment.

When the CMTS 32 in the sniffer is located at the same position as the CMTS 10 and receives training bursts from the CMs under test and makes the same time offset measurements as the CMTS under test 10, the measurements will be the same as those made by the CMTS under test 10 if CMTS 10 is working properly. Generally, the CMTS 32 and the CMTS 10 have offset measurements and develop equalization coefficients from training bursts which not the same. In this case, the self-ranging process described below is carried out to develop the proper corrections and equalization coefficients so as to achieve upstream synchronization (a state where upstream bursts can be successfully captured by the sniffer).

The CMTS receiver 32 transmits the captured upstream bursts to the CPU 34 on data path 31 along with the ranging measurements (time, phase, amplitude, gain and frequency offsets and equalization coefficients) for each CM under test which sent a training burst. The CMTS 32 also adaptively develops equalization coefficients for each CM from the preamble and possibly data of that CM's captured training burst.

CPU 34 functions to receive these measurements, coefficients, data, and messages and generate the proper control signals to control the system. It also transmits captured bursts and messages to computer 37, and may also transmit the ranging measurements made by the linecard for display and/or analysis. The CPU 34 also receives commands from the computer 37 and generates suitable control signals to control the linecard 26, cable modems in the sniffer 40 and 42 and the clock generator 48.

Data path 38 could be an Ethernet LAN connection, a USB or SCSI port, or any other known or proprietary bus or LAN and communication/bus protocol. The PC 37 is programmed to display and/or process the captured data, measurements, messages, coefficients, etc. and provide reports or just display the captured items.

Linecard Timebase

The linecard 26 needs to have a timebase which will keep it synchronized with the system upstream of interest so that the CMTS receiver 32 in the sniffer can capture designated upstream bursts. Therefore, the CMTS 32 must have a local timestamp counter which is synchronized with the master timestamp counter in the CMTS 10 under test because the master timestamp counter in the CMTS 10 is used to determine the upstream minislot boundaries for the upstream transmission grants to the CMs in the downstream MAP messages. So the linecard in the sniffer needs to have its local timestamp counter and minislot counter and frame counter (these three counters along with the upstream symbol clock are the most important clocks in the linecard timebase) synchronized with corresponding counters in the CMTS under test and in the cable modem under test so that the sniffer can determine when upstream minislot in which bursts to be captured are occurring at the tap points of the sniffer.

The basic idea of timebase synchronization is to get the timebase in the sniffer to a condition that an upstream burst in a particular minislot or group of minislots can be captured. This requires several things of the timebase. First, one must know when particular minislots are occurring at the sniffer upstream tap. Second, an upstream symbol clock in the sniffer must be in sync with the upstream symbol clock of the CM which transmitted the burst. In other words, when a cable modem under test has been told to transmit an upstream burst during a particular minislot, the timestamp and minislot counters in the sniffer (which will be coupled to the HFC upstream medium between the CM under test and the CMTS) must be in a state such that they can be used to determine when that particular minislot's signals are propagating past the sniffer's upstream tap point so that the upstream burst capture circuitry can be turned on to capture the burst. Then, if the upstream symbol clock in the sniffer linecard timebase is synchronized with the upstream symbol clock in the CM which transmitted the burst, the upstream symbol clock in the sniffer can be used to successfully recover the data in the burst.

Accordingly, the downstream timestamp samples in the downstream synchronization (hereafter sync or synch) messages and timestamp snapshot messages need to be sent to the linecard 26 for use in synchronizing the local timestamp counter in the CMTS receiver 32 in the sniffer to the master timestamp counter in the CMTS 10 under test at least in DOCSIS 2.0 burst capture mode, as will be described further below.

The CMTS receiver 32 in the sniffer also needs to generate a 10.24 MHz clock which is synchronized with the 10.24 MHz master clock signal used by CMTS 10 to increment the master timestamp counter in 2.0 SCDMA burst capture mode or which is frequency adjusted using timestamp samples in 1.x and 2.0 advanced TDMA burst capture mode so that the CMTS 32 can increment its local timestamp counter in synchronizm with the incrementation of the master timestamp counter in the CMTS 10.

In some embodiments, the A/D sampling clock in the RF section 28 also needs to be synchronized with the sampling clock in the burst acquisition circuitry of the CMTS 10 under test. Therefore, the linecard 26 must have a master clock synchronized with the master clock in the CMTS 10 under test at least for 2.0 SCDMA burst capture at least for these embodiments.

Generation of a 10.24 MHz master clock for the CMTS 32 starts by using DOCSIS 2.0 cable modem 40 to recover the downstream symbol clock. Once the downstream symbol clock is recovered, the CM 40 in the sniffer receives the downstream messages. These messages include: UCD, MAP, SCDMA upstream ratio numerator, SCDMA upstream ratio denominator, SCDMA timestamp snapshot and sync messages containing timestamp samples for TDMA channels, and ranging response messages. The ranging response messages contain ranging corrections of power, time, phase and carrier frequency offset and upstream equalization coefficients sent to the modems. The captured timestamp samples are sent to the linecard 26 as are the UCD and MAP messages. The ranging correction offsets and the US equalization coefficients for each particular CM are also sent to the linecard.

The CM 40 communicates with the linecard 26 to send these captured messages to CPU 34 via a local area network link 82. Data path 82 is also used to supply any control data needed by CM 40 from computer 34 such as data that defines which downstream RF carrier to tune and which downstream bursts are to be captured.

The captured MAP, UCD and other downstream messages must reach the linecard 26 early enough for the CPU 34 to use the data therein to control the linecard's CMTS receiver 32 and other burst capture circuitry in time to receive the designated upstream bursts from the CM under test. In order to help with the timing, two CMs are used to receive downstream data. CM 40 receives only downstream messages and sends them to the linecard via LAN link 82, and CM 42 captures only downstream data bursts and sends them to the linecard via LAN connection 80.

The delay in sending the timestamp samples to the linecard from the sniffer cable modem needs to be compensated. The exact timebase offset to use for this compensation can be found from the ranging offset corrections sent downstream by the CMTS 10 in response to an initial maintenance burst IUC3 from a cable modem close to the sniffer. In SCDMA mode, the timestamp snapshot is also sent from the CM 40 to the linecard 26 for use in establishing the correct relationship between the local timestamp counter and the local minislot and frame counters.

To generate a master clock for the CMTS receiver 32 in the sniffer, the CM 40 is also used to recover the downstream symbol clock in the normal manner and generate a phase coherent upstream clock reference to enable capture of DOCSIS 2.0 SCDMA bursts. In DOCSIS 2.0 SCDMA bursts, the upstream reference clock must be phase coherent with the downstream symbol clock. In DOCSIS 2.0 cable modems, and in CM 40 in the sniffer in 2.0 SCDMA burst capture mode, there is circuitry that operates to recover the downstream symbol clock and generate an upstream reference clock from it. This upstream reference clock is output on line 44 and is 2.56 MHz in the preferred embodiment, although in alternative embodiments, a 10.24 MHz or 20.48 MHz reference clock can be output on line 44 from the sniffer cable modem. In some embodiments, the CM 40 also generates an upstream symbol clock in 2.0 SCDMA burst capture mode which phase coherent with the recovered downstream symbol clock and has a frequency at a ratio of M/N where M and N are integers included in the UCD message. In embodiments where multiple upstreams are in use, the UCD message pertaining to the upstream on which bursts are to be captured is used. This M/N upstream symbol clock is the clock the linecard needs to capture 2.0 SCDMA bursts. Since this clock is generated in CM 40, it must either be provided on a separate output line (not shown) to the linecard, or the linecard must regenerate this clock frequency from the clock reference signal on line 46 which is also phase coherent with the recovered downstream symbol clock in 2.0 SCDMA burst capture mode. In some embodiments, CM 40 sends samples of this clock via LAN segment 82 to CPU 34 for use in keeping a PLL that regenerates the upstream symbol clock on the linecard synchronized.

Typically, a phase locked loop (PLL) is used to generate the M/N upstream clock. This PLL locks onto the downstream clock and generates an upstream clock which is phase locked to the downstream clock. An example of circuitry in a cable modem to perform this function is given in U.S. Pat. No. 6,243,369 which is hereby incorporated by reference. In some embodiments, a first PLL recovers and tracks the downstream clock and provides it as a reference frequency to another PLL which generates an upstream clock at a frequency M/N times the downstream symbol clock frequency.

In 2.0 SCDMA burst capture mode (which is the only mode where the clock reference on line 44 is generated), the upstream clock reference signal on line 44 is a 10.24 MHz clock signal divided by 4. This clock reference is output by CM 40 on line 44 at the upstream RF output (in a special test mode) as a 2.56 MHz reference clock signal to the clock generator 48. The 2.56 MHz reference signal on line 44 is phase coherent with the recovered downstream symbol clock, and is actually alternating ones and zeros at 5.12 MHz. In some embodiments, it is taken from the upstream input to the tuner of CM 40, and the upstream input to the tuner in CM 40 is disconnected. This is the main clock reference signal and is selected by multiplexer 50 most of the time. The other clock reference signals that can be selected for use by the clock generator 48 are mainly for test purposes. In some embodiments, the clock reference on line 44 derived by the cable modem is the only clock reference signal for the PLL 58 and even this signal is not required if only 1.x or 2.0 advanced TDMA bursts are the only bursts to be sniffed. In the preferred embodiment, the PLL 58 has its reference clock input coupled through a multiplexer to either the 2.56 MHz reference clock on line 44 or a 10.24 MHz reference clock on line 52 from an external sources such as a CMTS under test.

Any clock generator 48 which receives at least the recovered downstream clock reference signal on line 44 and which smoothes it out using a PLL or using any other means to remove or reduce the jitter and generates an upstream clock reference signal on line 46 will suffice the practice the invention and will be referred to in the claims as a "sniffer clock generator".

Figure 3:
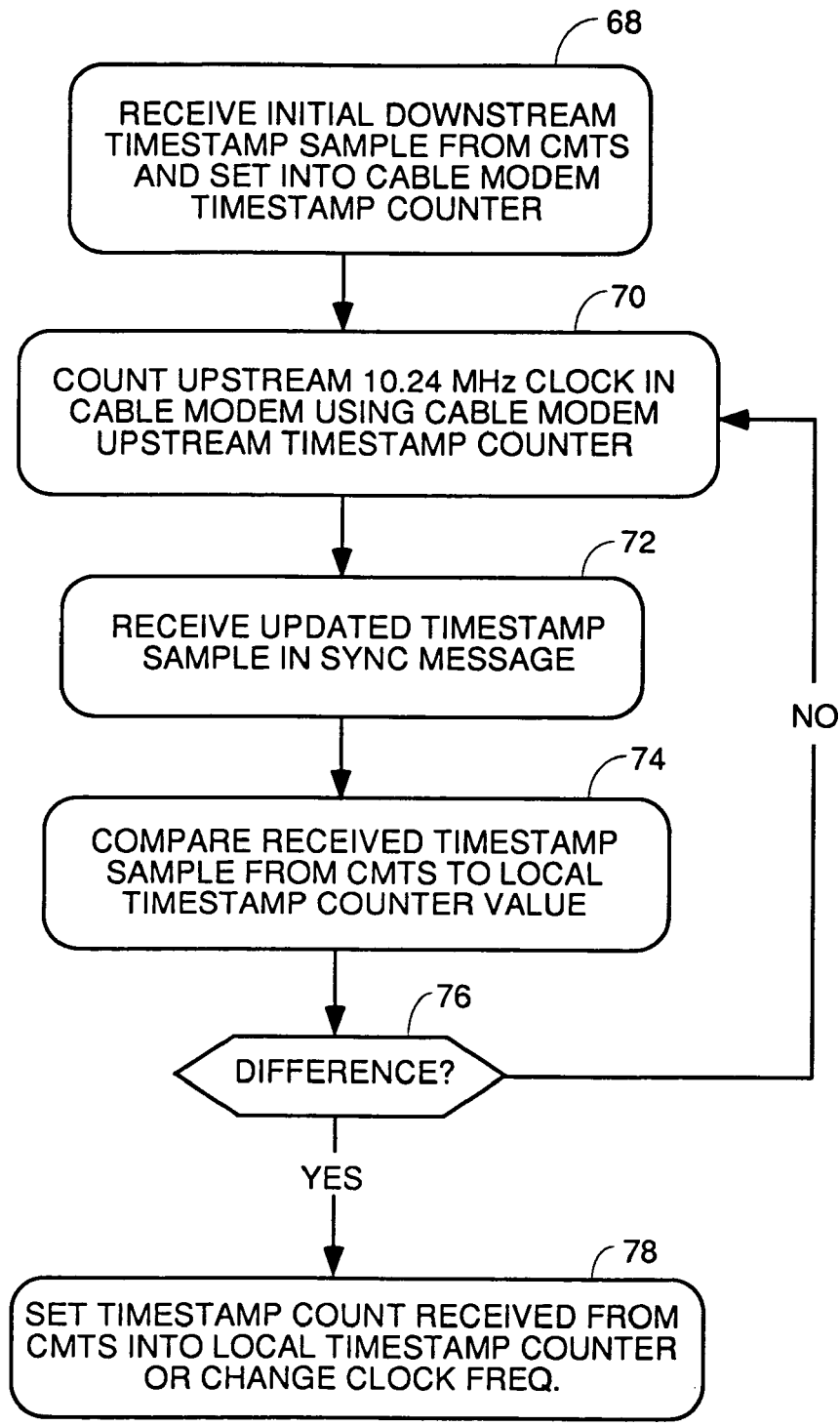
FIG. 3 is a flowchart of the process to keep any cable modem's local timestamp counter synchronized with the master upstream timestamp counter in the CMTS.

For TDMA bursts, DOCSIS 2.0, 1.1 and 1.0 cable modems, and CM 40 in particular, have a free running 10.24 MHz upstream clock which is counted by a local timestamp counter in the CM. Each cable modems however must keep its local timestamp counter synchronized with a master upstream timestamp counter in the CMTS which is counting the master clock because the local timestamp counter and local minislot counter which are both counting the same master clock, are used to determine when the upstream minislots assigned to each CM are occurring. To keep the CM timestamp, minislot and frame counters in sync with the CMTS corresponding counters in 1.x and 2.0 advanced TDMA burst capture mode, the CMTS periodically sends timestamp counter samples downstream in sync and timestamp snapshot messages. The timestamp snapshot messages contain samples of the CMTS master upstream timestamp and minislot and frame counters taken at the time of the message. The CMs receive these timestamp sample messages in TDMA mode, and use the timestamp samples in them to make corrections to their local timestamp and minislot counters as will be detailed below. This process of maintaining synchronization of the local upstream timestamp counter in each CM in the system using the sync messages is illustrated in the flowchart of FIG. 3. A more comprehensive process flow which includes an alternative embodiment of the process of FIG. 3 is given for DOCSIS 2.0 SCDMA burst capture and DOCSIS 1.x and 2.0 advanced TDMA burst capture mode in FIGS. 10 and 11, respectively (each of which is comprised of multiple sheets).

The CM 40 in the sniffer also performs this process, but it is not necessary since neither CM 40 or CM 42 will send any upstream bursts so knowledge by these CMs of the upstream minislot boundaries is not necessary in some embodiments. However, the CMTS receiver 32 in the sniffer does need to know the upstream minislot boundaries so that it can use the MAP and UCD data to capture upstream bursts from the CM under test. Accordingly, CM 40, which recovers the timestamp samples from the CMTS under test along with all the other downstream messages such as ranging corrections, MAP messages and UCD messages, sends these timestamp samples and all the other captured downstream messages to the sniffer linecard. The linecard in the sniffer uses the timestamp samples received from CM 40 to make initial settings and corrections in an upstream timestamp, minislot and frame counters, depending upon the mode.

Each upstream minislot has a number and its boundaries in time are defined by the master timestamp counter in the CMTS under test. There will always be an offset at any instant of time between the timestamp counter in the CMTS 32 and the timestamp counter in the CMTS 10. This offset is caused by the propagation time of the timestamp sample messages sent downstream. Even if the local timestamp counter in the sniffer is set to the timestamp count in the first timestamp sample received after power up and counts a clock at the same frequency as the master clock, that timestamp sample would have been take some time earlier, so the actual timestamp count of the master timestamp counter will be ahead of the local timestamp counter in the sniffer. This offset should be constant however, and any difference is corrected by using the timestamp samples and ranging corrections to correct the count of the local timestamp counter or to change the local 10.24 MHz clock frequency so as to maintain a constant offset which is set to achieve precise minislot boundary and frame synchronization.

This tracking and constant offset between the local timestamp counter in CMTS 32 and the master timestamp counter will be referred to in the claims as either synchronization or "tracking the changes" of the master timestamp counter. This tracking of changes and correction using timestamp samples in downstream sync messages is done in DOCSIS 1.x and DOCSIS 2.0 advanced TDMA burst capture mode only. In DOCSIS 2.0 burst capture mode, the 10.24 MHz clock in the linecard is not free running as it is in DOCSIS 1.x or 2.0 advanced TDMA burst capture mode. Instead, it is locked to the 10.24 MHz master clock in the CMTS by virtue of it being generated from the 20.48 MHz reference clock on line 46 which is locked into phase coherency with the downstream symbol clock recovered by CM 40. The downstream symbol clock is itself locked into phase coherency with the 10.24 MHz master clock in the CMTS under test, so there should never be any drift between the local timestamp counter in the sniffer and the upstream timestamp counter in the CMTS under test.

Since the recovered symbol clock in SCDMA mode is more accurate, the sniffer CM should be set in the SCDMA mode when the CMTS under test is in SCDMA or mixed mode with a first SCMDA logical channel which is time division multiplexed with one or more other logical channels carrying other types of bursts such as TDMA or SCDMA at a different symbol rate than the symbol rate of the SCDMA burst in the first logical channel.

To receive 2.0 SCMDA bursts, the CMTS 10 and the CMTS 32 each use their own upstream phase locked symbol clocks to receive the bursts because the upstream symbol clock in the CM that sends each SCDMA burst is locked to or phase coherent with the downstream symbol clock generated by the CMTS as is the upstream symbol clock in the CMTS 10. The CMTS upstream symbol clock is generated from its master clock in both CMTS 32 and CMTS 10.

In 1.x and 2.0 ATDMA mode, each CM under test and the CMTS 32 in the sniffer has a free running clock which is counted by its timestamp counter. The process to keep the local timestamp counter synchronized with the master timeststamp counter in 1.x and 2.0 ATDMA burst mode capture in the CMTS 32 and the CM 40 in the sniffer and in every other CM in the system is illustrated in the flowchart of FIG. 3.

The first step in getting each cable modem's local upstream timestamp counter in synchronization with the master upstream timestamp counter in the CMTS 10 is symbolized by block 68 in FIG. 3. There, the first timestamp received from CMTS 10 after a CM powers up is set into the cable modem's local timestamp counter (this assumes the CM has already recovered the downstream symbol clock and is receiving downstream messages).

In step 70, the local free running 10.24 MHz clock is counted by the local timestamp counter in the CM. Since the master upstream timestamp counter in the CMTS is also counting a master 10.24 MHz clock, the counts at the CMTS and the CMs should remain relatively close except there will be a fixed offset caused by propagation delay and some drift caused by frequency drift of the clocks. In step 72, another timestamp sample of the count in the upstream master timestamp counter at the CMTS is received in a sync message. The newly received timestamp sample is compared in step 74 to the local timestamp counter in the CM in step 74. Step 76 represents the branch condition on the comparison. If there is a difference, step 78 is performed to reduce or eliminate the difference. IN the case of a CMTS, the error can be eliminated by setting the timestamp received from the CMTS under test into the local timestamp counter in the timebase of the sniffer. If there is no difference, processing returns to step 70. In some embodiments of this process, instead of using the difference to correct the actual count, the difference is used to generate an error signal to change the frequency of the clock that drives the local timestamp counter.

The master clock in the CMTS 32 is generated from, or, in some embodiments is, a 20.48 MHz clock on line 46 generated by a clock generator 48. Any clock generator structure which can generate a 20.48 MHz reference clock on line 46 which is phase coherent with the recovered downstream symbol clock in DOCSIS 2.0 SCDMA burst capture mode will suffice to practice the invention. In the preferred embodiment, the reference clock on line 44 is supplied as one input to a multiplexer 50, and a 10.24 MHz reference clock from a CMTS under test is suppled to the other input of multiplexer 50. PC 37 is programmed to allow a user to select the desired reference clock input as between the signals on lines 52 and 44, and generates a clock select signal on line 54 either directly or indirectly through a command sent to CPU 34 over the data path 38. The clock signal on line 52 is the 10.24 MHz master clock of the CMTS 10 under test. The clock signal on line 64 is the 20.48 MHz clock available from CMTS receivers manufactured by Terayon Communication Systems, Inc. of Santa Clara, Calif. The clock signal selected by multiplexer 62 is controlled by a signal on line 35 from computer 34, and is output on line 56 to serve as a reference clock input to a PLL 58. The PLL 58 is controlled by the PC 37 though commands sent on data path 38 to CPU 34 to multiply the reference clock signal by a factor of 2 or a factor of 4, and output a 20.48 MHz reference clock signal on line 60. The PLL 58 also acts as a sort of filter on the reference clock signal from the CM 40 to clean up its waveform. The PLL 58 should have a bandwidth which is narrow enough to make sure the phase noise is small. In TDMA mode, the clock signal output by the CM 40 can be jittery because it is controlled by the received timestamps. In SCDMA mode, the upstream reference clock on line 44 is much cleaner because the CM 40 uses an internal PLL to generate it from the recovered downstream symbol clock.

The reference clock signal on line 60 is coupled to one input of a multiplexer 62. The other two inputs to the multiplexer are a 20.48 MHz reference clock output on line 64 from a CMTS under test or an internal 20.48 MHz reference clock on line 66 generated by linecard 26. The other clock inputs on lines 52, 64 and 66 are for testing and greater utility purposes, and may be eliminated in some embodiments.

Any phase differences between the master upstream symbol clock of CMTS 10 and the upstream symbol clock of the CMs under test 18 is corrected out in a timing recovery loop in the CMTS 10. There are two processes that go on in the CMTS 10 to receive upstream bursts and in CMTS 32 to capture upstream bursts. The first is recovery of the upstream symbol clock in 1.x and 2.0 advanced TDMA bursts. The second process involves recovery of the QAM symbols themselves where phase, amplitude, timing and frequency offsets are measured during the processing of a ranging burst transmitted upstream by a particular CM and the measured offsets are sent back to this CM to make corrections in its transmitter.

This rotational amplifier uses known preamble data prepended to each burst to develop phase and amplitude correction factors which are used to remove phase and amplitude errors in the data portions of the burst.

The CMTS receiver 32 in the sniffer 20 also has a timing recovery loop like CMTS 10. CMTS 32 generates phase error correction factors from the preambles and data symbols of training bursts its captures from any of the cable modems 18 which are used to correct phase errors in the data symbols of data bursts. In the preferred embodiment, the CMTS receiver 32, like CMTS 10, has a preamble processor which processes the known preamble symbols of each burst to generate initial phase and frequency offset correction factors. These offset correction factors are then provided to a timing recovery loop which uses them as a starting point to again process the symbols of the preamble to develop fined tuned phase and frequency correction factors and then uses these correction factors to correct phase and frequency offsets in the data symbols of the burst. However, any DOCSIS 2.0 compatible receiver structure will suffice for circuit 32.

The personal computer 37 has any user interface suitable to control the sniffer, and is programmed to receiver user commands indicating which channels on the upstream and downstream to monitor and capture bursts and message traffic. In particular, the user picks the upstream channel ID. When the captured bursts and/or message traffic is transferred to the CPU 34 from the CMTS receiver 32 or the cable modem 40 (which receives downstream bursts and messages from the CMTS 10), the PC 37 can then display the data of the captured bursts or messages for analysis on a display (not shown). The personal computer is programmed with any program that allows the user to specify which upstream and downstream logical channels to monitor, which bursts and/or messages to capture and which data and/or messages received from the sniffer to process and display.

Downstream Sniffing

In the preferred embodiment, shown in FIG. 1, the sniffer 20 uses two cable modems 40 and 42 to sniff the downstream. CM 40 captures only downstream DOCSIS messages such as ranging invitations, MAP messages, UCD messages, ranging response messages and all the other DOCSIS 2.0 downstream messages. CM 42 captures only the downstream data bursts. A local area network or other data path 80 couples this CM to the CPU 34 so that recovered downstream data and other things may be sent to the CPU 34 and transferred to the PC 37, and so that any control data needed by the CM can be supplied by computer 34 such as control data that defines which downstream RF carrier to tune and which downstream bursts are to be captured.

Figure 2:
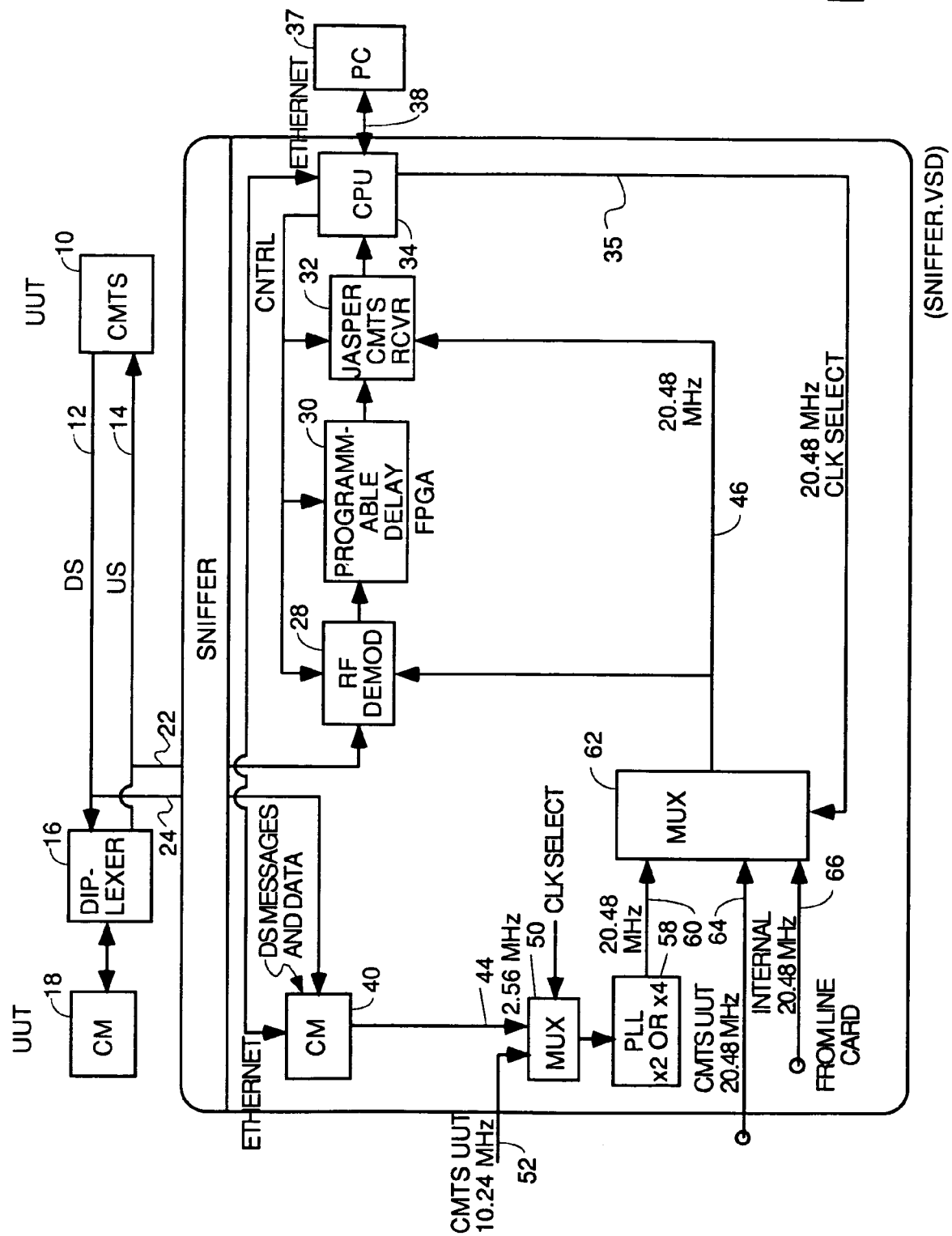
FIG. 2 is a block diagram of an alternative embodiment of a sniffer capable of capturing both upstream and downstream bursts and using only a single cable modem in the sniffer to capture both downstream bursts and downstream messages.

The division of labor between CMs 40 and 42 improves the performance of the system since there may be hundreds of cable modems such as CM 18 coupled to the same CMTS 10. In alternative embodiments such as is shown in FIG. 2, only a single cable modem 40 is used to capture all downstream data bursts and message traffic for all cable modems such as 18. The cable modems 40 and 42 can be any DOCSIS cable modem structure which is capable of receiving DOCSIS 2.0 bursts and message traffic which are modified in accordance with the teachings herein. In the preferred embodiment, both cable modems 40 and 42 can also receive DOCSIS 1.1 and DOCSIS 1.0 bursts and message traffic.

The cable modem 40 and the CMTS receiver 32 must each be capable of receiving at least DOCSIS 2.0 bursts and messages regardless of the type of multiplexing, symbol rate, channel frequency, modulation type and all the other programmable parameters of DOCSIS 2.0 systems.

The cable modems 40 and 42 are conventional except that a few software changes are necessary for the sniffer function. These modifications are:

(1) collecting downstream bursts addressed to other cable modems, and packetizing them into a LAN packet addressed to CPU 34 or otherwise transferring them to CPU 34 by any other data path;

(2) sending the captured downstream bursts and the TLVs (data elements) of the UCD and MAP messages to the linecard 26 by packetizing them into a LAN packet addressed to CPU 34 or otherwise transferring them to CPU 34 by any other data path;

(3) capturing and sending the ranging corrections from ranging response messages addressed to cable modems under test to the linecard 26 by packetizing them into a LAN packet addressed to CPU 34 or otherwise transferring them to CPU 34 by any other data path;

(4) receiving and implementing control messages from the linecard CPU 34 such as messages specifying SIDs of particular CMs under test for which the cable modems of the sniffer are to capture the downstream data bursts and messages directed thereto by the CMTS under test; and (5) enabling a debug mode and a mode to capture upstream SCDMA bursts wherein a 2.56 MHz reference clock generated from the recovered downstream clock in SCMDA mode at least is output at upstream RF output 44 for use by the linecard 26 for generating an upstream symbol clock which is phase coherent with the recovered downstream clock. Generation of this reference clock from the sniffer cable modem which is phase coherent with the recovered downstream clock is only necessary where upstream DOCSIS 2.0 SCDMA bursts are to be captured or in debug mode, and, in alternative embodiments, the reference clock generated is 10.24 MHz or some harmonic thereof, but in all cases where SCDMA bursts are to be captured, the reference clock must be phase coherent with the captured downstream clock. Generation in the sniffer of an upstream symbol clock is not necessary to the invention if TDMA or DOCSIS 2.0 advanced TDMA bursts are the only bursts to be captured.

Any DOCSIS 2.0 compatible cable modem which has been modified to have the functionality of at least elements 1, 2, 3, 4 and 5 above will suffice to practice the invention to capture DOCSIS 2.0 SCDMA bursts, and will be referred to in the claims as a "sniffer cable modem". However, the term "sniffer cable modem" should also be interpreted to not require generation in the sniffer of an upstream symbol clock which is phase coherent with the recovered downstream clock where TDMA or DOCSIS 2.0 advanced TDMA bursts are the only types of bursts to be captured.

Self Ranging

The CMTS receiver 32 receives both timestamps and timestamp snapshot messages from the CM 40 in the sniffer which receives downstream messages in 2.0 SCDMA mode. The CM 40 can send these messages to CPU 34 via a local area network link 82 or other data path which couples the CM 40 to the CPU 34. The sniffer linecard 26 receives the upstream training bursts from the CM 18 under test just like the CMTS 10 under test receives them. The training burst is processed in CMTS 32 just like it is processed in CMTS under test 10 to make time, frequency, phase and gain offset measurements and to develop upstream equalization coefficients from the known preamble data in the training burst. However, the CMTS 32 is often not located at the same position in the system as the CMTS 10, so these offset measurements and equalization coefficients developed in CMTS 32 will not be the same as are developed in CMTS 10.

Because the CMTS 32 in the sniffer is at a different location than the CMTS under test (sometimes), the time, frequency, phase and amplitude offset corrections and the equalization coefficients developed by CMTS 32 are not sent to the CM under test 18. To do so would interfere with the actual time, frequency, phase and amplitude offset corrections and the equalization coefficients sent to the CM 18 by the CMTS 10 under test and developed from CM 18's upstream ranging burst by CMTS 10. Instead, the time, frequency, phase and amplitude offset corrections and the equalization coefficients developed by CMTS 32 from a captured training burst from a CM under test 18, after transfer to the CPU 34, are modified and then used to adjust certain circuits in the sniffer. This is done to achieve proper synchronization with CM 18 whose upstream bursts are to be captured. The same process happens in CMTS 32 for every other CM in the system. More specifically, the adjustment of the sniffer's circuitry to achieve self-ranging is done using the ranging corrections developed by CMTS 32 from a particular CM's upstream training burst after subtracting the ranging corrections sent downstream to that CM by the CMTS 10. The modified time, phase, frequency, amplitude offsets and upstream equalization coefficients are used to set the coefficients of the programmable digital upstream equalization filter in FPGA 30, the delay of a programmable delay circuit in FPGA 30, the coefficients of a rotational amplifier in the CMTS 32 and the gain of an amplifier, and the frequency offset in the RF demodulator section 28. CPU 34 makes the subtraction or other processing necessary to get the right frequency, phase, gain and timing offsets for use in the sniffer. The results are loaded into the appropriate circuits on the linecard 26 to get it into a state where it can receive upstream bursts from a particular CM under test.

Thus, for example, the results of a subtraction of the upstream equalization coefficients sent by CMTS 10 from the upstream equalization coefficients developed by CMTS 32 are loaded as the filter coefficients of the programmable equalization filter in FPGA 30. The result of a subtraction of the gain adjustments developed by the CMTS 10 and the CMTS 32 is used to adjust the gain of a programmable gain amplifier in RF section 28 via control signals on bus 36. The frequency offset developed by CMTS 10 from the training burst sent by CM 18 is subtracted from the frequency offset developed by CMTS 32, and the result is used to adjust a local oscillator signal feeding a mixer in RF demodulator 28 to achieve the proper IF frequency. A subtraction of the time offset developed by the CMTS 10 from the time offset developed by CMTS 32 from the same training burst from a particular CM is used to set the amount of a programmable delay imposed by a programmable delay circuit in FPGA 30. This allows the sniffer to achieve proper timing, phase, frequency and amplitude alignment and proper upstream equalization to receive upstream bursts from a particular CM transmitting on a particular upstream.

In some embodiments, the ranging corrections developed by CMTS 32 will be transferred to the CPU 34 for transfer to the computer 37 and the captured downstream ranging corrections from the CMTS 10 will be sent from CM 40 to CPU 34 and from there to computer 37 for comparison with the ranging corrections determined by CMTS 32 to see if they are the same. This comparison is only meaningful as a test on the ranging correction functionality of CMTS 10 if the sniffer 20 is located at the same location on the HFC upstream medium 14 as the CMTS 10.

Note that if the self-ranging corrections are done while a burst is being received by the CM 40 or 42, the burst may be corrupted. Therefore, the corrections should be done only when they are big enough. Also, in the preferred embodiment, the corrections are scheduled when no bursts are scheduled to be received, a fact which is known from the downstream MAP messages captured by the CM 40. The trigger signal generated by CMTS receiver 32 can be used to schedule the corrections.

The frequency correction offset is made in the RF demodulator circuit 28 using the difference by subtracting from the frequency offset correction developed by the CMTS receiver 32 from the captured training burst from CM 18 the frequency offset correction developed by the CMTS under test 10 from the same training burst from CM 18. The difference is used to adjust the local oscillator frequency in the RF demodulator circuit 28 to a frequency necessary for the upstream channel being tuned to develop the correct intermediate frequency.

Power corrections based upon the power offset measurement made by CMTS receiver 32 less the gain corrections made by CMTS 10 from the same training burst are made in the RF demodulator circuit 28 based upon the calibration of the RF gain. The RF gain is adjusted according to the gain difference between the gain offset calculated by the sniffer CMTS 32 and the gain offset calculated by the CMTS 10 under test. Gain correction resolution is ¼ dB. The gain corrections at the linecard RF demodulator circuit 28 use a calibration table which provides a translation between the gain control number sent by the sniffer CPU to control the gain of a programmable gain amplifier in the RF demodulator circuit 28 and the resulting attenuation in the RF signal that results.

Small time offset corrections in response to time offset measurements made by the CMTS receiver 32 are made in the sniffer by adjusting time delay in a programmable delay circuit in FPGA 30. If larger time offset corrections are needed, the timestamp counter in the cable modems 40 and 42 and the CMTS receiver 32 need to be adjusted. The first step in making corrections in the sniffer based upon time offset corrections is to set the timestamp counter in the CM 40 and 42 (for just 40 or just 42, depending upon the embodiment) to the value of captured timestamp. The next step is to correct the sniffer CMTS 32 timestamp counter to a new value based upon the time offset correction developed by CMTS 32 in the sniffer from the captured upstream training burst from CM 18 minus the time offset correction developed by CMTS under test 10 from the same training burst.

The programmable equalizer filter in FPGA 30 obtains new filter taps by convolving the current equalizer filter taps with the new correction tap coefficients after self ranging. The new correction tap coefficients are the equalizer tap weights developed during a tap weight adaptation process carried out by the CMTS receiver 32 on the known preamble symbols of a training burst from a CM under test. The results of the convolution have subtracted therefrom the tap weights of the equalizer tap corrections developed by the CMTS 10 under test during processing of the preamble of the training burst received from a CM and sent downstream to the CM under test in a ranging response message. Equalizer tap weights for the equalizer filter in FPGA 30 are developed in this way for every CM under test. To simplify the implementation, the equalizer filter in FPGA 30 can be updated only when the equalizer corrections are big enough.

Since the signal received by the FPGA 30 is centered at an IF frequency of 5.12 MHz, the signal should be first down converted to baseband, and after the equalizer filter, the signal should be up converted back to the IF frequency of 5.12 MHz.

The local oscillator whose signal is used to mix the received signal down to baseband is:

$$LO = \cos(2*\pi*5.12 \text{ MHz}*t) - j*\sin(2*\pi*5.12 \text{ MHz}*t) \quad (1)$$

Since the time t is samples at 20.48 MHz=4*5.12 MHz, the down conversion local oscillator is a simple signal comprised by +1, −1 and zeros:

$$LO = (1,0,-1,0,1,0,-1,0 \ldots) - j(0,1,0,-1,0,1,0,-1 \ldots) \quad (2)$$

The up conversion local oscillator that is used after the equalizer filter to upconvert the signal back to IF is similar to the down conversion local oscillator except a positive sign exists before the imaginary component beginning with j in the complex number.

Sniffer Timebase Synchronization Processes

The way that the cable modems under test get their timebases in synchronization is as follows.

DOCSIS 1.x and 2.0 Advanced TDMA and DOCSIS 2.0 Timebase Synch in CM's Under Test The timebase of the cable modems under test are synchronized according to the normal operations of cable modems in the system.

DOCSIS 2.0 Sniffer Timebase Synchronization Process

The process the sniffer 20 goes through to get into synchronization with the upstream and downstream is illustrated in the flowchart of FIGS. 10A through 10D. The process of FIGS. 10A through 10D essentially boils down into four basic steps: (1) recovering a downstream symbol clock so as to enable capture of downstream messages by the sniffer, and generating a local upstream reference clock in the sniffer from the recovered downstream clock which is phase coherent with and locked to the recovered downstream clock; (2) using the local upstream reference clock to synchronize a timebase in the sniffer with the timebase including a local upstream minislot counter; (3) performing a self ranging step to make adjustments in circuits in the sniffer to synchronize it with an upstream upon which bursts to be captured are to be transmitted; and (4) using the upstream minislot counter and data in captured downstream messages to capture upstream bursts including SCDMA bursts transmitted from a cable modem under test.

In step 178, the sniffer of FIG. 1 or FIG. 2 receives a command from the computer 37 indicating which DOCSIS 2.0 downstream to which the sniffer is to monitor. This is the preferred embodiment where there may be multiple DOCSIS downstreams sharing one upstream and/or multiple DOCSIS upstreams sharing a DOCSIS downstream, and there may be multiple logical channels on each DOCSIS upstream and there may be flexible mapping between the groupings of downstreams and corresponding upstreams so that more upstream or downstream capacity can be added as warranted by traffic conditions.

In step 180, the cable modem in the sniffer recovers the downstream clock of the designated DOCSIS 2.0 downstream from step 178, and uses that recovered downstream clock to recover downstream messages and bursts. In some embodiments, all downstream messages and bursts directed to all CMs are captured, and, in other embodiments, only messages and bursts directed to particular CMs designated by computer 37 or pertinent to particular upstreams designated by computer 37 and linked to the downstream designated in step 178 are captured. The CM, (CM 40 in the case of the embodiment of FIG. 1) then generates a reference clock from the recovered downstream clock which is locked to or phase coherent with the recovered downstream clock. In the preferred embodiment, the reference clock is a 2.56 MHz clock, but in other embodiments, the reference clock generated from the recovered downstream symbol clock can be a 10.24 MHz clock or a 10.24/N MHz clock where N is any integer. This step is performed for DOCSIS 2.0 SCDMA upstream burst recovery only and the reference clock must be phase coherent with the recovered downstream symbol clock. Phase coherent means that for every X cycles of the downstream clock, where X is an integer, there will be Y cycles of the downstream clock where Y is an integer an the zero crossings at the end of X and Y cycles of the two clocks, respectively, will be simultaneous.

In step 182, the sniffer receives commands from computer 37 indicating which upstream or logical channel(s) linked to the downstream designated in step 178 to which the sniffer linecard should synchronize, and which bursts on the designated upstream or logical channel(s) (designated by SID, IP address, minislot number, etc.) which are to be captured.

In step 184, the CM in the sniffer captures the UCD and MAP messages for all the upstreams or logical channels, or at least captures the UCD and MAP messages for the upstream or logical channel designated in step 182. The captured UCD and MAP messages, or at least the TLV data items therefrom are sent to the linecard.

In step 186, the CM in the sniffer captures the downstream sync messages of the designated downstream which corresponds to the designated upstream, and captures all the timestamp snapshot messages in the designated downstream for all the upstreams or logical channels that share the designated downstream, or at least for the upstream or logical channel designated in step 182.

In step 188, a phase lock loop oscillator in the sniffer multiplies the reference clock signal generated by the CM in the sniffer, if needed, by a suitable factor so as to generate a reference clock for the linecard which is phase coherent with the downstream symbol clock. This upstream reference clock generated by the PLL has to be fast enough to allow generation of a chip clock which is synchronized with the chip clock of the CM that sent an SCMDA burst so that the chip clock can be used in demultiplexing upstream SCDMA bursts in the CMTS receiver 32. In the preferred embodiment, the reference clock generated by CM 40 is 2.56 MHz and it multiplied by a factor of four in the PLL to generate a 20.48 MHz reference clock for the linecard. In other embodiments, the reference clock for the linecard can be 10.24 MHz. The frequency is not important other than to comply with DOCSIS specifications. In general, outside of DOCSIS, the only requirement is that the reference clock for the linecard be phase coherent with the downstream symbol clock and the upstream symbol clock used by the CMs and with the upstream symbol clock used by the CMTS.

In step 190, if necessary, the linecard uses the 20.48 MHz reference clock (which is phase coherent with the recovered downstream symbol clock) to generate a 10.24 MHz local clock which is locked to the recovered downstream symbol clock and which is synchronized (except for a phase difference caused by propagation delays) with the 10.24 MHz master clock in the CMTS 10 which is driving the master timestamp counter.

In step 192, the linecard sets the initial value of its local timestamp counter to the timesample sample number received in the first downstream sync message for the designated upstream captured by CM 40 after the sniffer powered up. Different upstreams tied to the same downstream in DOCSIS 2.0 can have different minislot sizes so they will have separate timestamp snapshot messages and they also have different sync messages, one for each upstream. But the master timestamp counter from which the downstream timestamp samples are taken and master 10.24 MHz clock are shared by all upstreams. Thereafter, the local timestamp counter is driven by the local 10.24 clock which has been slaved to the master 10.24 MHz clock shared by all upstreams. This is by virtue of the downstream symbol clock being slaved to the 10.24 MHz master clock in the CMTS and the slaving (locked into phase coherency) of the reference clocks generated in the sniffer to the recovered downstream symbol clock. The local timestamp counter should then track the changes in the master timestamp counter in the CMTS without drift with some offset because of the propagation delay. In some embodiments, no drift is assumed. In the preferred embodiment, the timestamp counts in subsequent sync messages are compared to the local timestamp count. If the local timestamp counter is off by more than some programmable values, such as one count, from the timestamp sample in subsequent sync messages, the local timestamp counter is set to the value in the sync message. This offset is set by the self-ranging process in the sniffer to achieve minislot and frame synchronization with the upstream or logical channel upon which bursts to be captured are transmitted.

In step 194, the linecard CPU searches the UCD messages received from the CM pertaining to the designated upstream and retrieves the M and N values from the UCD message that corresponds to the upstream or logical channel which will carry bursts to be captured. These M and N values and the recovered downstream symbol clock are used to generate an upstream symbol clock for DOCSIS 2.0 bursts to be used in the sniffer CMTS to recover 2.0 upstream bursts by multiplying the ratio M/N times the 10.24 MHz reference clock in the sniffer in an M/N PLL. This synchronizes the upstream symbol clock in the sniffer with the upstream symbol clock in the CM under test for the designated upstream or logical channel.

In step 196, the data in the captured timestamp snapshot message pertinent to the designated upstream channel is used to set the correct values into the linecard's local upstream minislot and frame counters. If the sniffer has one set of minislot and frame counters for each possible upstream it monitors, the minislot and frame counter corresponding to the designated upstream are set to correct values using the pertinent timestamp snapshot message.

In step 198, the linecard in the sniffer captures an initial station maintenance burst from the CM under test. This training burst continues on the HFC system to the CMTS 10 under test after capture by the sniffer. The CMTS 32 in the sniffer then makes time, phase, frequency and power offset measurements on the preamble of known symbols of the captured initial station maintenance burst. The CMTS 32 also develops upstream equalization filter coefficients using the preamble of the captured training burst. All these offset measurements and the equalization coefficients are sent to the CPU of the linecard.

In step 200, the CM in the sniffer captures a downstream ranging response message from the CMTS 10 under test which is sent in response to the initial training burst. That ranging response message is sent to the CPU of the linecard.

In step 202, the linecard CPU takes the time offset measurement of the ranging response message and substracts if from the time offset calculated by the CMTS 32 in the sniffer. The result is sent as a command to a variable delay circuit in the FPGA in the linecard and is used to advance the count of the local timestamp counter by enough to establish upstream frame and minislot synchronization for the designated upstream and/or logical channel.

In step 204, the linecard CPU uses the rest of the measurements (phase, frequency and power offsets and equalization coefficients) made on the training burst from the CM under test and the ranging corrections from the ranging response message sent by the CMTS under test to send appropriate power, phase and frequency, and upstream equalization filter coefficient adjustment commands to the RF demodulator circuit 28 and equalization filter in the FPGA 30 of the linecard so as to complete the process of upstream synchronization. Subsequent periodic station maintenance bursts are captured and measurements made and the ranging response downstream messages are captured. The CPU repeats the self ranging process using these subsequent measurements to keep the sniffer in sync.

In step 206, the linecard searches the MAP message data pertinent to the designated upstream or logical channel and determines the minislot numbers of the upstream bursts to be captured. The UCD data pertinent to the upstream or logical channel on which a burst is to be captured is also searched and the burst parameter data of each burst to be captured is retrieved and used to generate suitable control signals to the sniffer burst capture circuitry to set it up to capture the burst.

The linecard then monitors the local timestamp counter in step 208, and when the minislot number which is the first minislot at the beginning of a burst to be captured occurs at the linecard upstream tap, the linecard circuitry to capture the designated burst is turned on.

The captured burst is then sent to the CPU 34 of the linecard for transfer to the computer 37 for display and/or analysis, as symbolized by step 210.

Figure 11A:
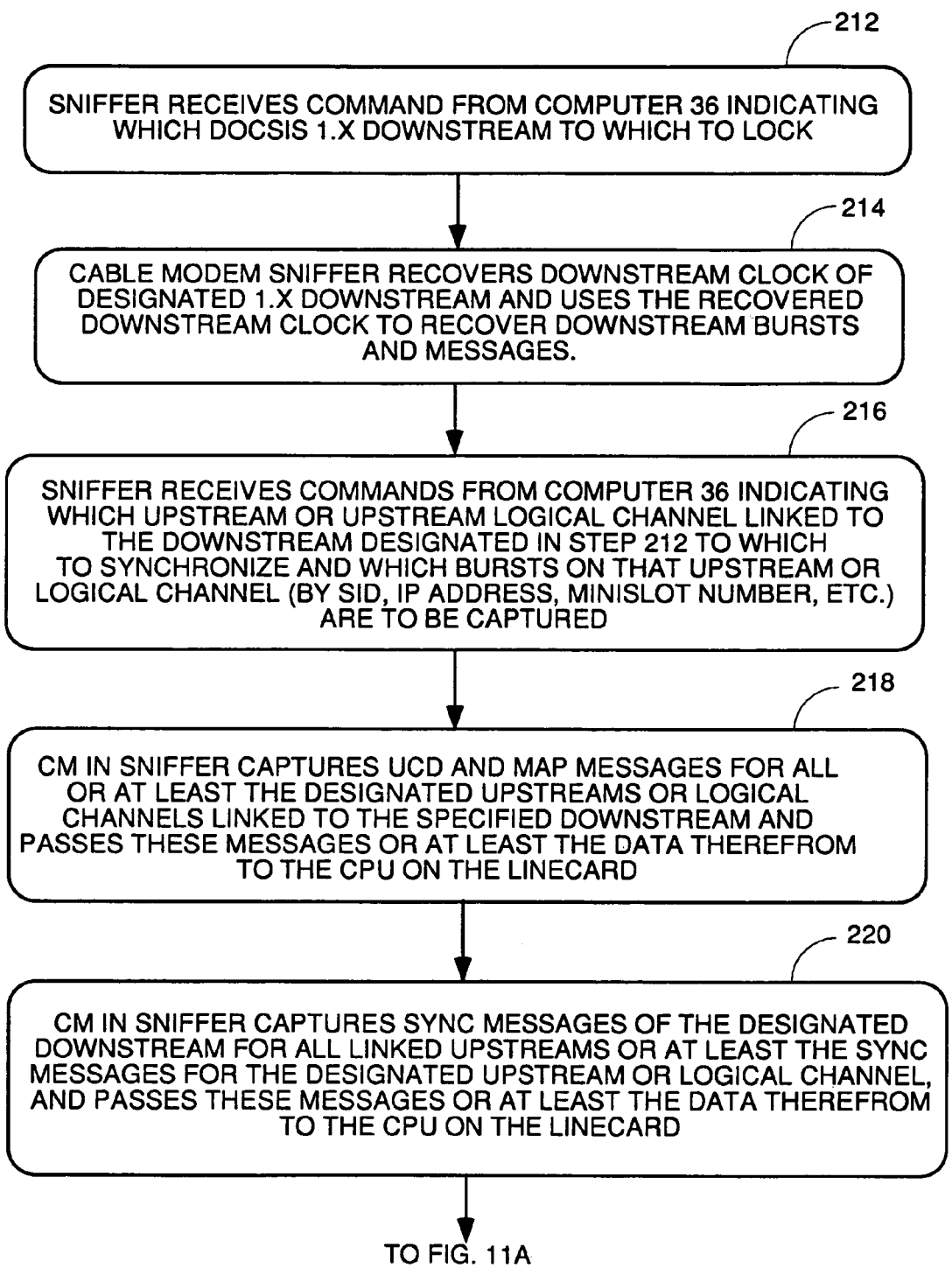
FIGS. 11A through 11C illustrate the process the DOCSIS 2.0 upstream and downstream sniffers of FIGS. 1 and 2 go through to establish synchronization with a designated downstream and a designated upstream.
Figure 11B:
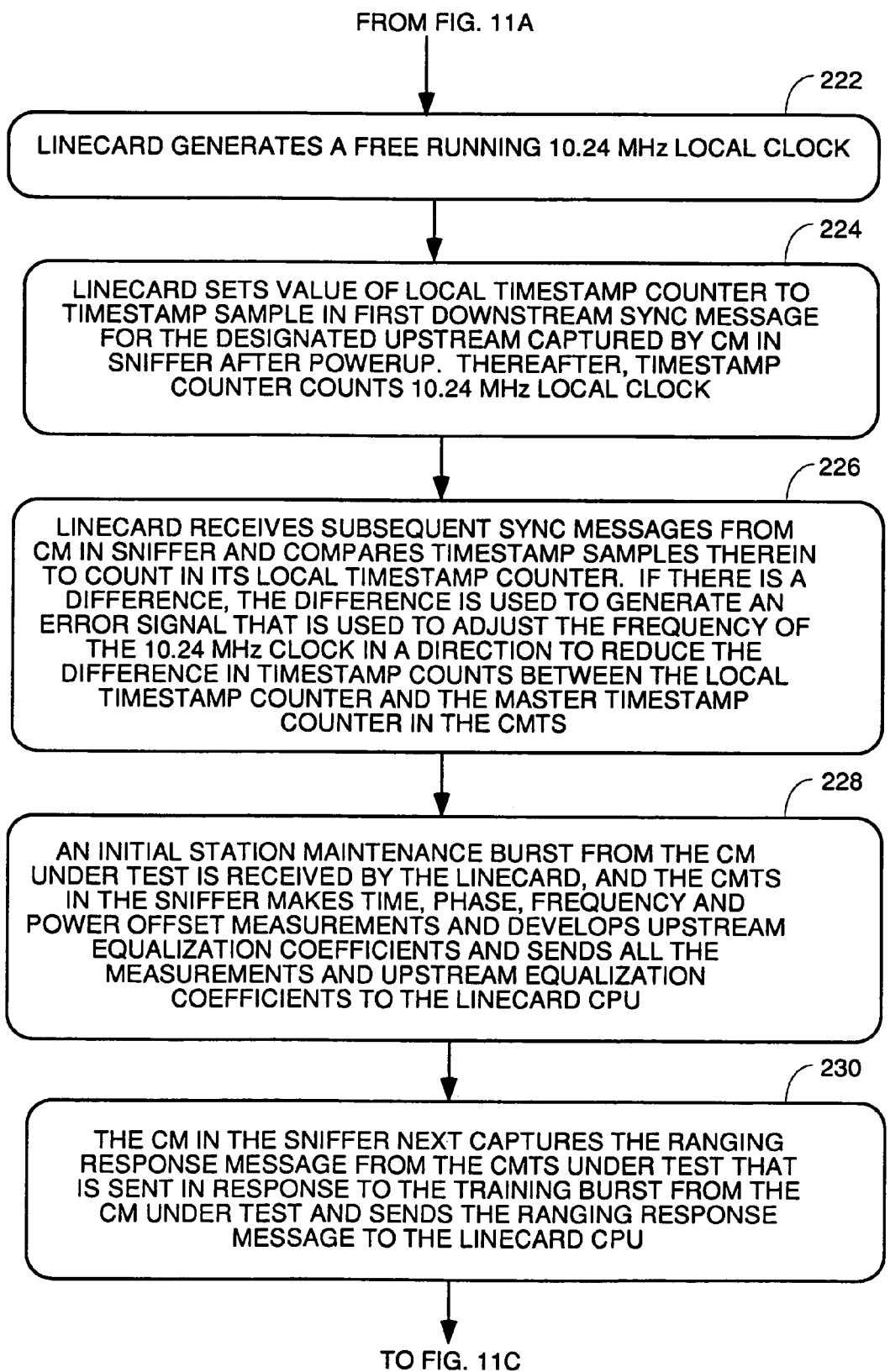
Figure 11C:
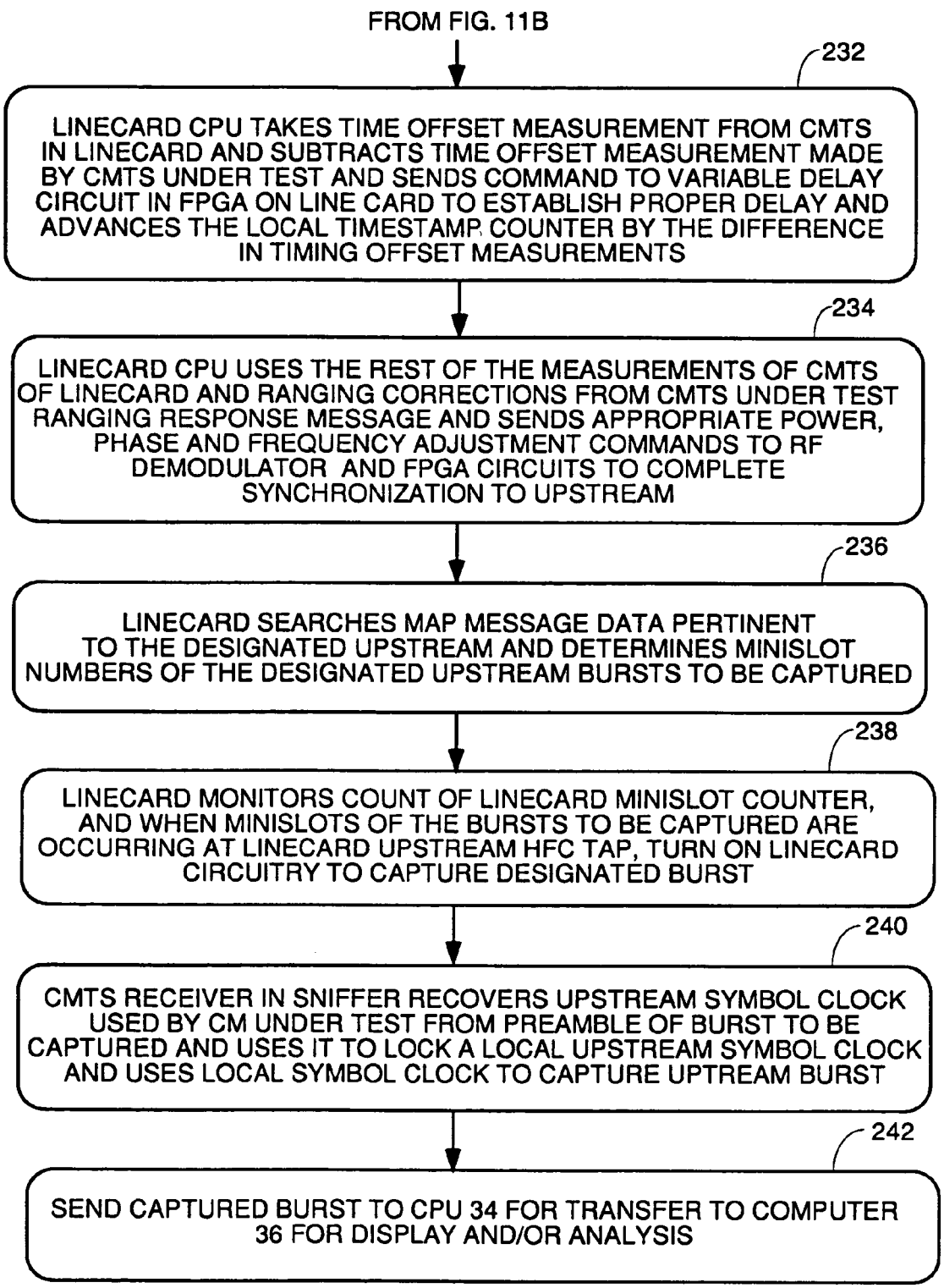

FIGS. 11A through 11C illustrate the process the DOCSIS 2.0 upstream and downstream sniffers of FIGS. 1 and 2 go through to establish synchronization with a designated downstream and a designated upstream and capture downstream bursts and upstream DOCSIS 1.x bursts and upstream DOCSIS 2.0 advanced TDMA bursts. In step 212, the sniffer of FIG. 1 or FIG. 2 receives a command from computer 37 indicating which DOCSIS 1.x downstream to which to lock. The cable modem in the sniffer then recovers the downstream symbol clock of the designated downstream, and uses the recovered clock to recover downstream bursts and messages in step 214. In step 216, the sniffer receives commands from computer 37 that indicate which upstream or upstream logical channel linked to the downstream designated in step 212 to which to synchronize and which bursts on that upstream or logical channel (by SID, IP address, minislot number etc.) are to be captured.

In step 218, the CM in the sniffer captures downstream UCD and MAP messages for all the upstreams linked to the downstream designated in step 212 or at least for the upstream or logical channels upon which the upstream bursts designated in step 216 will be transmitted. In step 220, the CM in the sniffer captures sync messages of the designated downstream for all linked upstreams or at least for the upstream or logical channel(s) designated in step 216. These captured sync messages, or at least the data therefrom, are passed on to the linecard CPU 34 in step 220.

In step 222, the linecard generates a free running 10.24 MHz clock signal using a PLL. In step 224, the linecard sets the initial value of a timestamp counter in the sniffer to the timestamp sample value in the first sync message captured by the CM in the sniffer in the downstream after powerup or after receiving the message indicating what downstream to lock to and locking to that downstream. In step 226, the linecard receives subsequent sync messages from the CM in the sniffer. The timestamp samples in these subsequent sync messages are compared to the timestamp count of the local timestamp counter. If there is a difference, the new timestamp value is loaded into the timestamp counter in the CMTS 32 or wherever the timestamp counter in the timebase of the sniffer is located. In the CMs of the sniffer and the CMs under test, the new timestamp value difference is used to generate an error signal that is used to adjust the frequency of the local 10.24 MHz clock in a direction to reduce the difference in the timestamp counts between the local timestamp counter and the master timestamp counter in the CMTS.

In step 228, an initial station maintenance burst from the CM under test is received by the linecard, and the CMTS in the sniffer makes time, phase, frequency and power offset measurements using the known symbols of the preamble. The CMTS in the sniffer also uses the preamble of the training burst to adaptively develop upstream equalization filter coefficients. The CMTS in the sniffer then sends all these offset measurements and equalization filter coefficients to the CPU 34 on the linecard.

Next, in step 230, the CM in the sniffer captures the ranging response message sent by the CMTS 10 under test to the CM under test that sent the training burst. This ranging response message contains the time, phase, frequency and power offset measurements made by the CMTS under test on the same training burst that was processed by the sniffer CMTS in step 228. The captured ranging response message is sent to the CPU on the linecard.

In step 232, the linecard CPU takes the time offset measurement from the CMTS in the linecard and subtracts the time offset measurement made by the CMTS under test, and sends a command to the variable delay circuit in the FPGA on the linecard to establish a proper delay to implement the difference. The difference is also used to advance the timestamp counter count by an amount sufficient to achieve upstream minislot boundary synchronization between the sniffer and the CMs under test.

In step 234, the linecard CPU uses the rest of the ranging measurements developed by the CMTS in the sniffer and the ranging measurements developed by the CMTS under test and generates suitable commands based upon the differences to control circuitry in the RF demodulator to make appropriate phase, power and frequency adjustments and to set the filter coefficients of the equalization filter in the FPGA to achieve proper upstream equalization for the position of the sniffer on the HFC upstream medium relative to the CMTS under test. This completes synchronization to the upstream or logical channel designated in step 216.

In step 236, the linecard searches the MAP data pertinent to the designated upstream and determines the minislot numbers of the designated upstream bursts to be captured. The UCD data pertinent to the upstream or logical channel on which a burst is to be captured is also searched and the burst parameter data of each burst to be captured is retrieved and used to generate suitable control signals to the sniffer burst capture circuitry to set it up to capture the burst.

In step 238, the linecard monitors the count of the linecard minislot counter, and when the beginning minislot number of a burst to be captured occurs on the linecard minislot counter (or just before it occurs), suitable commands are generated by CPU 34 to turn on the burst capture circuitry of the sniffer and capture the burst.

In step 240, the CMTS receiver in the sniffer recovers the upstream symbol clock used by the CM under test that transmitted the burst that was captured. The symbol clock is recovered from the preamble of the captured burst, and is used to synchronize a local upstream symbol clock which is used to recover the data in the data portion of the burst.

Finally, in step 242, the captured burst data is sent to the CPU 34 for transfer to the computer 37 for display and/or analysis.

Sniffer Interfaces

The sniffer interfaces for the embodiments of FIGS. 1 and 3 are the upstream RF interface to the upstream medium of the HFC system, the downstream RF interface to the downstream medium of the HFC system, a 20.48 MHz reference clock input to couple to a CMTS under test, a 10.24 MHz clock interface to the CMTS under test, and a 10/100BaseT Ethernet interface to the personal computer 37.

Alternative Sniffer Embodiments Using Only a Cable Modem

Figure 4:
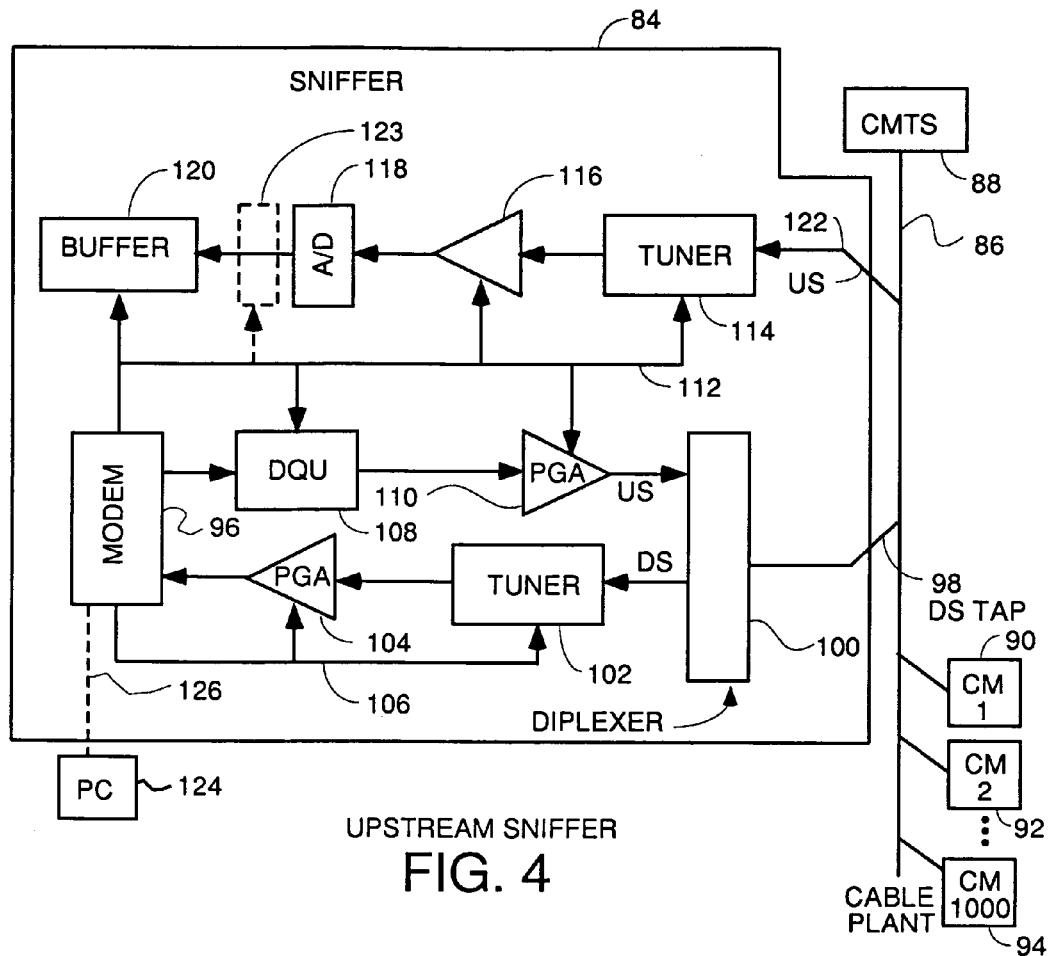
FIG. 4 is block diagram of a sniffer using a cable modem to determine the upstream timing and to control a burst capture circuit to capture upstream bursts of other cable modems.
Figure 5:
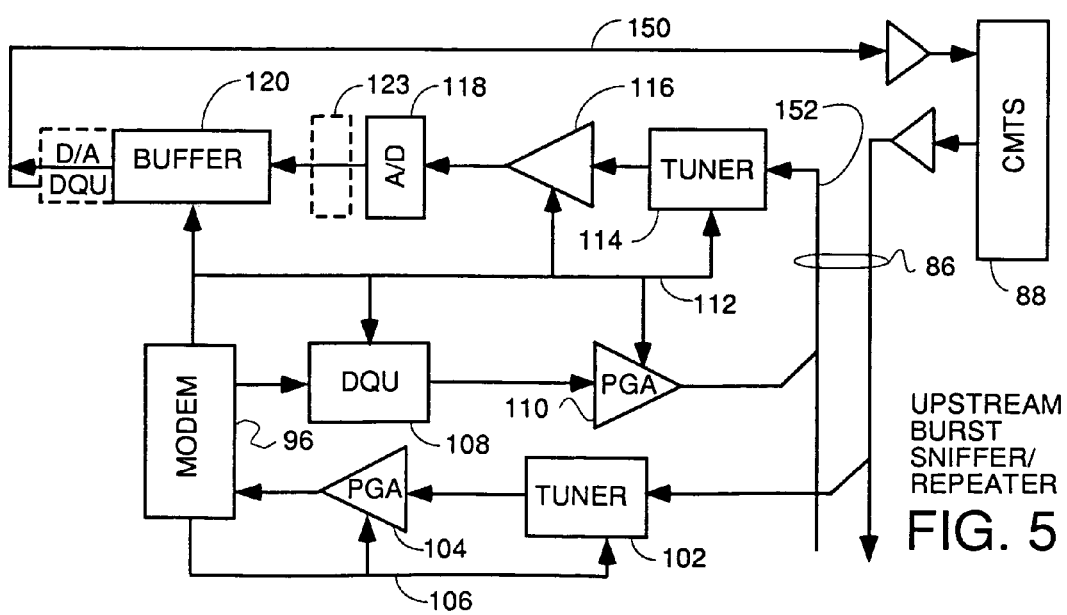
FIG. 5 is block diagram of a sniffer using a cable modem to determine the upstream timing and to control a burst capture circuit to capture upstream bursts of other cable modems and having the capability to repeat captured bursts upstream.
Figure 6:
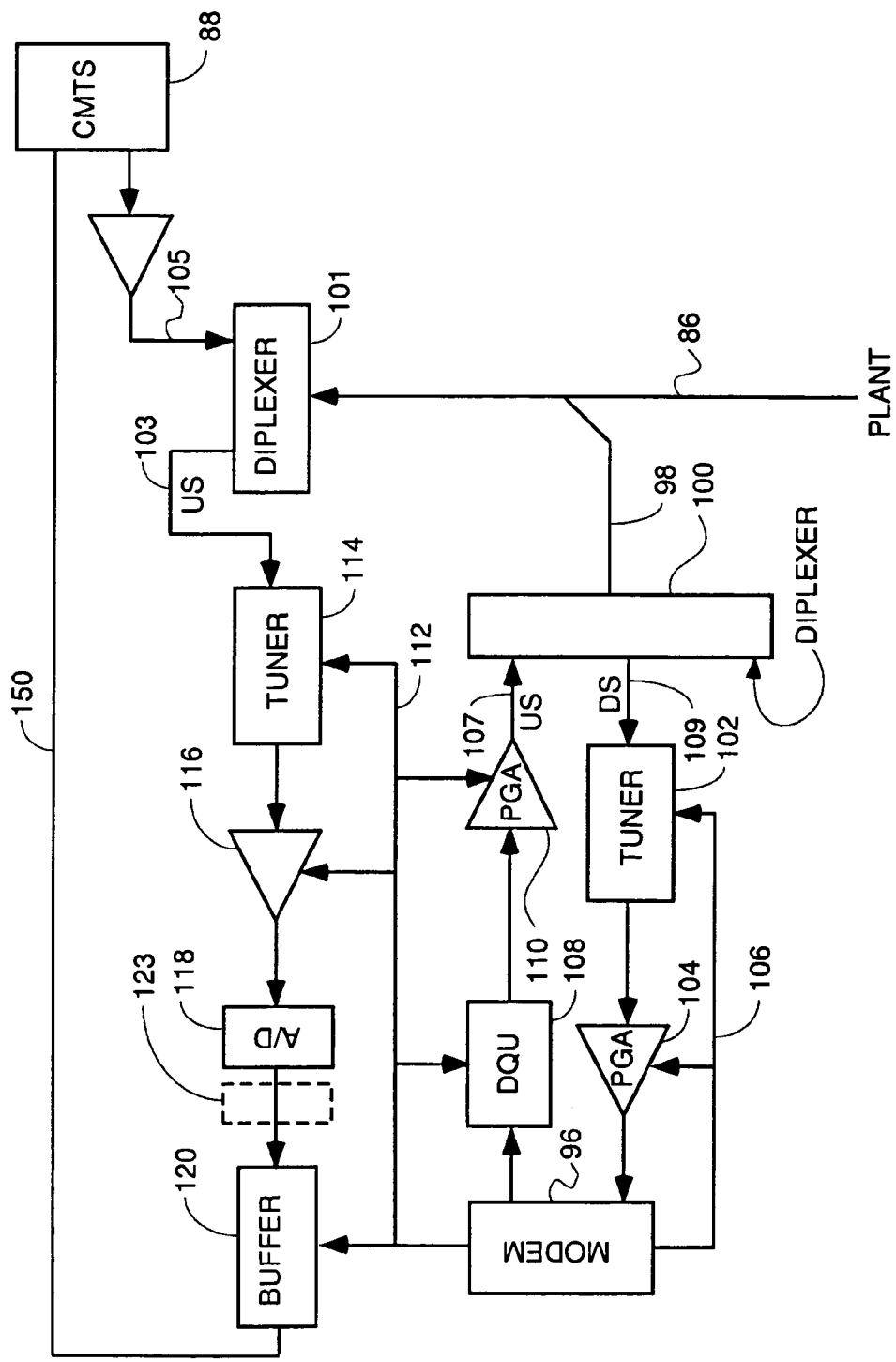
FIG. 6 is block diagram of an alternative embodiment of a sniffer using a cable modem to determine the upstream timing and to control a burst capture circuit to capture upstream bursts of other cable modems and having the capability to repeat captured bursts upstream.

FIGS. 4, 5 and 6 are block diagrams of sniffers which use only a cable modem to capture upstream bursts from any of the other cable modems in the system. Since the cable modem in these alternative embodiments sniffers receive the downstream MAP messages, it knows the assigned minislots for all the other cable modems in the system. Since it is locked onto the same downstream as all the other cable modems in the system, it also has its upstream timestamp counter synchronized using the same timestamp samples from the sync messages and timestamp snapshots in DOCSIS 2.0 downstreams as all the other cable modems in the system. Since every cable modem in the system uses the same free running upstream clock frequency and the same sync messages to keep their local upstream timestamp counters in synchronization with the master upstream timestamp counter in the CMTS, each cable modem in the system will be using the same timestamp counts to determine the boundaries of the upstream minislots at the location of that cable modem. Thus, the cable modem in the sniffer can be used advantageously to control a separate tuner and buffer in the sniffer to capture every upstream burst in the system.

Referring to FIG. 4, the sniffer 84 has a cable modem 96 which is coupled to both the downstream medium and the upstream medium of HFC system 86 (separate DS and US mediums not shown). To be able to capture the upstream bursts from all other cable modems on the system using the sniffer of FIG. 4, it must be connected to the HFC system 86 at a point closer to the CMTS 88 than all the other cable modems on the system. The other cable modems on the system are shown at 90, 92 and 94. If it is not so coupled, it will only be able to intercept and capture the upstream bursts of the other cable modems on the HFC system farther away from the CMTS than the sniffer.

The cable modem 96 is coupled to the downstream from the CMTS 88 via a diplexer 100, a programmable tuner 102, and a programmable gain amplifier 104. All these circuits are conventional and are controlled by the modem 96 via control signals on bus 106 to tune the correct downstream channel after initially searching for and locking onto any legitimate DOCSIS downstream channel at power up and registering as a cable modem in the system. The CMTS will then send a message to the cable modem telling it what downstream channel to which it should tune. The cable modem 96 is also coupled to the upstream by a conventional DQU (digital quadrature up converter) 108 which receives constellation points of upstream bursts in digital format and modulates them onto quadrature upstream carriers and transmits them on the upstream medium through diplexer 100. Diplexer 100 controls the direction of transmission of the upstream and downstream signals so that downstream signals enter tuner 102 and signals received from programmable gain amplifier 110 enter the upstream medium of HFC system 86.

A programmable gain amplifier 110 amplifies the upstream RF signals generated by CM 96 in accordance with gain control signals received from the cable modem on bus 112. The cable modem 96 controls the frequency of the upstream carriers via signals on bus 112 to the DQU 108 for transmissions to the CMTS 88. The cable modem 96 controls the frequency and gain levels of its transmitted signals in accordance with downstream instructions from the CMTS 88 just like any conventional DOCSIS 2.0 cable modem.

Because the sniffer is a cable modem which is tuned to the CMTS downstream, it registers with CMTS 88 as a regular cable modem, and it receives all the downstream messages including the MAP, UCD, sync, ranging-request and ranging response messages. Because it has the regular DOCSIS 2.0 cable modem functionality, it will respond to ranging response messages by sending training bursts and will receive ranging response messages which include timing offset, power offset, phase offset and frequency offset correction measurements made by the CMTS 88 on the training burst sent by the sniffer 84. It will also receive upstream equalization coefficients developed by the CMTS 88 from the training burst sent upstream by the cable modem 96 in the sniffer. The cable modem 96 also recovers the downstream symbol clock and generates a DOCSIS 2.0 upstream clock for use in sending upstream 2.0 SCDMA bursts and forwarding them to the CMTS under test in some embodiments. For TDMA bursts, the sniffer's cable modem uses a free running symbol clock counted by an upstream timestamp counter which is corrected in accordance with the process of FIG. 3 using the downstream timestamp messages whenever deviations from a synchronized state occurs. When sniffer 96 makes all the requested corrections in the ranging response message and has its local timestamp counter in sync with the CMTS master upstream timestamp counter, it will be completely synchronized to the CMTS 88 and will be synchronized with all the other cable modems in the system and will be able to determine when each upstream minislot is occurring at its tap point 98 on the HFC system.

Because sniffer 84 receives the MAP messages in the downstream, it knows what the upstream assigned minislots are for every other CM in the system. To capture the upstream bursts from the other CMs in the system, the cable modem 96 sends control signals on the bus 112 to a separate line of circuits called the burst capture circuitry in the claims which functions to capture the upstream bursts. This line of circuitry includes a tuner 114 which the cable modem controls by signals on bus 112 to turn on during the duration of the burst and to set the frequency of a local oscillator (not shown) in tuner 114 to tune to the upstream carrier frequency of the burst to be captured. Typical structures for the tuner are shown in the patent application which is incorporated by reference herein and which is published in Europe and covers the Jasper CMTS receiver (Docket Number TER-013, EPO Publication number 1235402). Typical tuner structure for circuit 114 includes a mixer and local oscillator to mix the center frequency of the desired channel with the burst to be captured down to some intermediate frequency of a passband filter such as a SAW filter. The SAW filter or other filter is then used to filter out undesired RF signals on the high and low side of the band of frequency components in the Fourier spectrum of the burst to be captured. In some embodiments, an analog passband filter with programmable filter coefficients which can be altered to adjust the bandwidth of the passband of the filter is used to do this filtering. In DOCSIS 1.0, 1.1 and 2.0 bursts, the symbol rate is programmable so the bandwidth of the burst depends upon the symbol rate. This means a filter with a programmable bandwidth can be used to filter out unwanted RF signals outside the bandwidth of interest. However, this is difficult to do in the analog domain and the signals of the burst to be captured are still analog inside tuner 114. Therefore, in the preferred embodiment, a SAW filter with a fixed bandwidth passband which is set wide enough to encompass the bandwidth of a DOCSIS burst having the highest possible symbol rate is used to filter out most unwanted RF signals inside tuner 114. Then, in an optional alternative embodiment (as indicated by the dashed lines around filter 123), a digital passband filter 123 is used. This programmable digital filter is coupled to receive the digital samples output by an analog-to-digital converter 118. The digital filter 123 has programmable filter coefficients which are set by the cable modem 96 by signals on bus 112 to establish the passband of the filter 123 according to its symbol rate so as to filter out the unwanted RF components outside the actual bandwidth of the burst to be captured. The cable modem 96 knows the symbol rate of every burst to be captured from the burst profile data in the UCD messages it receives from the CMTS 88 in the DOCSIS downstream. There is one UCD message for every channel. Data in these UCD messages define the burst and channel characteristics for every burst the corresponding channel.

A programmable gain amplifier 116 is controlled by signals on bus 112 from cable modem 96 to turn on during the duration of the burst to be captured and its gain is controlled to amplify the received signal to the proper level to use the full dynamic range of an A/D converter 118. The A/D converter is enabled by a signal on bus 112 during the burst to be acquired. Finally, a buffer 120 captures the digital samples which define the captured burst. The cable modem 96 controls the buffer via enable signals on bus 112 to enable the buffer to store the samples of the burst when the burst arrives.

The cable modem 96 uses the data in the downstream MAP messages to know when each cable modem will transmit and uses its local timestamp counter counts to know when those assigned upstream minislots are occurring at the upstream sniffer tap 122. The upstream sniffer tap 122 couples the upstream medium of the HFC system 86 to the RF input of the sniffer tuner 114. The cable modem 96 uses information in the UCD message to know the frequency, symbol rate and other burst parameters of the burst to be captured. The cable modem 96 then suitably controls the tuner 114 and the programmable gain amplifier 116 and the A/D converter 118 and the programmable digital filter 123 (if used) and the buffer 120 to capture the samples of each burst in buffer 120. The burst is not actually removed from the upstream medium by the sniffer. It continues to the CMTS so as to not cause the CMTS protocols to be adversely affected.

Once the sample data in the burst is captured, it may be processed in any way desired.

In some embodiments, the sniffer 84 captures every burst. In other embodiments (as indicated by dashed lines in FIG. 4 to PC 124), the sniffer 84 is controlled by a user interface implemented on a personal computer 124 so as to only capture selected bursts such as all bursts from a particular CM or all bursts of a specified type. The PC 124 is coupled to the cable modem typically by a 100BaseT LAN link 126. However, in alternative embodiments, the connection to the PC 124 may be by any known interface such as USB, SCSI, Firewire, Fibre Channel, 100BaseT, token ring, etc. or by a proprietary interface.

Figure 7:
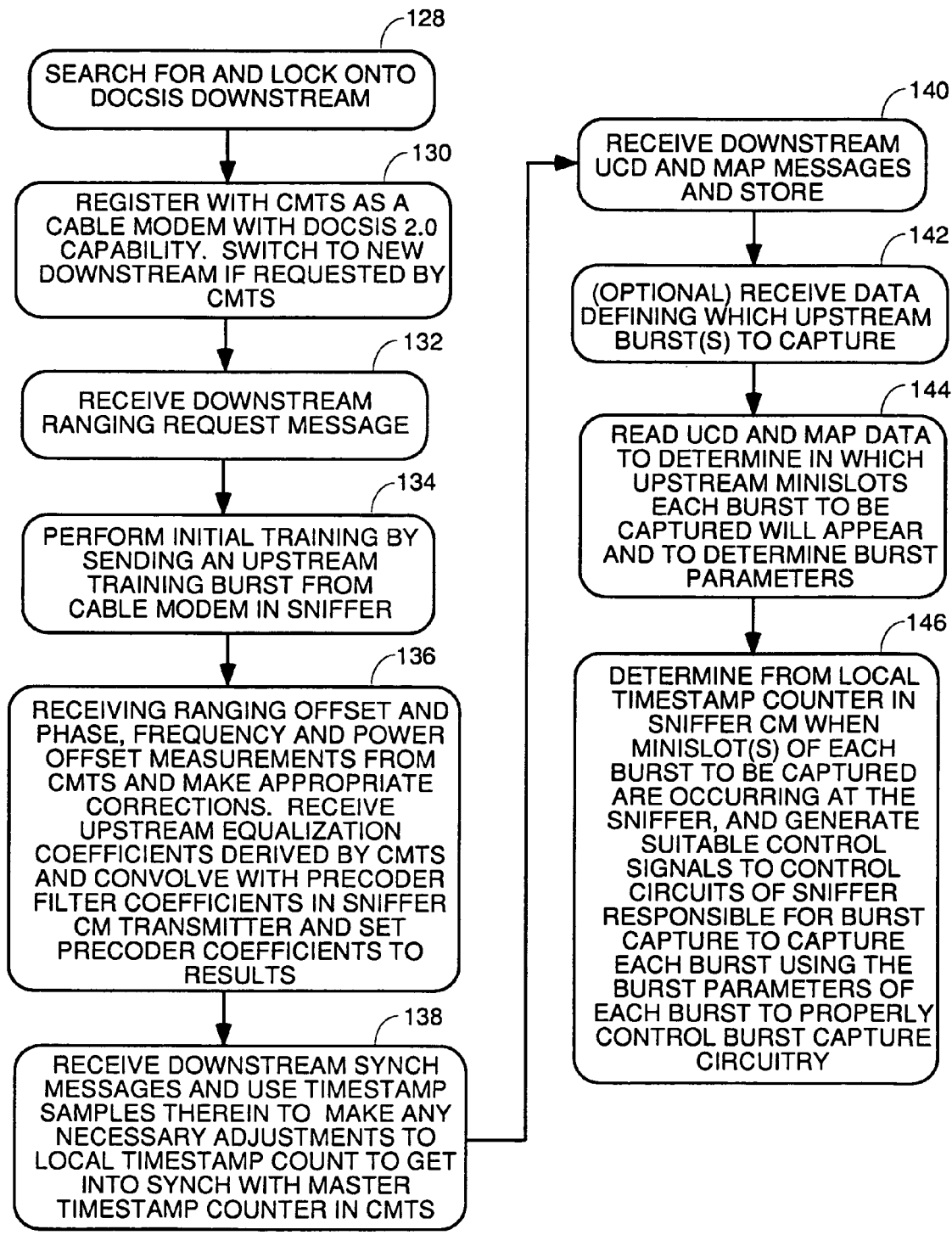
FIG. 7 is a flowchart of the new part of the process carried out by the cable modem in the sniffer of FIG. 4.

Referring to FIG. 7, there is shown a flowchart of the process carried out by the sniffer of FIG. 4 to lock onto a DOCSIS downstream, register as a cable modem, get into synchronization with the CMTS and start capturing upstream bursts. Step 128 represents the process of the sniffer of FIG. 4 searching for any legitimate DOCSIS downstream and locking onto it. This step is performed conventionally in the manner any DOCSIS 2.0 cable modem performs this process. Step 130 represents the process of the cable modem in the sniffer of FIG. 4 registering with the CMTS as a DOCSIS 2.0 cable modem. The CMTS may order the cable modem to switch to another downstream after the cable modem in the sniffer has registered with the CMTS, and, if this occurs, the cable modem will tune to this requested downstream, lock onto it and may re-register using the upstream associated with the new downstream. This process, although not specifically mentioned in steps 128 and 130, is also symbolized by steps 128 and 130.

Step 132 represents the process of receiving a downstream DOCSIS ranging request message that defines a ranging contention interval during which cable modems which have not performed their initial training may do so. In step 134, the cable modem in the sniffer performs an initial ranging offset determination and sets its ranging offset, and then transmits an initial training burst using this initial ranging offset in an attempt to hit the ranging contention interval. If the training burst hits the ranging contention interval and does not collide with another training burst, the CMTS processes the training burst to determine a ranging offset, frequency and amplitude offsets, a phase offset and calculates upstream equalization coefficients from the known preamble data. The data portion of the training burst tells the CMTS which cable modem sent the training burst. The ranging offset is a measurement of how far off the desired time of arrival at the CMTS the training burst arrived (it is supposed to arrive at the beginning of the ranging contention interval). The frequency offset is a measurement of how far off the frequency of the training burst is from the desired frequency of the upstream channel which this cable modem transmitted upon. The amplitude offset is a measurement of how much the CM must adjust its transmit power to cause its burst to arrive at the CMTS at nominal or desired power. The phase offset is a measurement of how far off the desired phase the training burst was. The equalization coefficients are coefficients developed by an adaptive equalization process which when set into an upstream equalization filter in the CMTS equalizes the upstream channel on which the training burst was sent to remove the intersymbol interference effects of echoes and dispersion (different propagation speeds of different frequencies) of the Fourier frequency components of the transmitted signal. The CMTS then sends these offset corrections and equalization coefficients down to the cable modem in the sniffer, which receives them in step 136. The cable modem then makes the requested ranging offset adjustments, adjusts it frequency and transmit power, adjusts its phase and convolves the equalization coefficients with the coefficients of the precode filter in the upstream transmitter of the sniffer which were in use when the training burst was sent.

Step 138 represents the process of receiving downstream synchronization messages and using the timestamps therein to make any necessary adjustments in the localt timestamp counter in the cable modem in the sniffer. This is done by the process of FIG. 2 typically, and results in the local timestamp counter being in synchronization with a master upstream timestamp counter in the CMTS used by the CMTS to determine the boundaries of upstream minislots assigned to various CMs for upstream transmissions. The state of synchronization means that the local timestamp counter will be counting at a virtually identical rate and there will be a fixed offset caused by propagation delays, and whenever the offset gets out of sync, a correction will be made in the local timestamp count using the timestamp sample from a sync message or timestamp snapshot message.

Step 140 represents the process of receiving the downstream UCD and MAP messages and storing them. The UCD messages define the burst parameters such as frequency and symbol rate and modulation type for every upstream burst and its logical channel. The MAP messages are bandwidth grants which define the minislots during which each cable modem may transmit upstream.

Step 142 represents the optional process of receiving input commands indicating which bursts to capture or other data indicating exactly which IP addresses or Service Identifiers (SIDs) or upstream minislot numbers to sniff. In some embodiments, all upstream bursts will be captured, but in others, data will be received from an external control process such as a control process running on a personal computer coupled to the sniffer by a Ethernet connection controlling the sniffer to capture only selected bursts. In some embodiments, the sniffer listens to registration traffic and learns the SIDs of each cable modem in the system.

Step 144 represents the process of reading the UCD and MAP messages to determine when the bursts to be captured are going to be arriving at the sniffer (to determine the upstream minislots assigned to the bursts to be captured), and to determine the burst parameters such as the frequency of the logical channel on which the burst will be transmitted and its symbol rate.

Finally, in step 146, the sniffer determines from its local timestamp count when the burst to be captured will be arriving at the sniffer and generates suitably timed control signals on bus 112 to control the burst capture circuitry to capture the burst. Specifically, the tuner will be enabled and ordered to tune the proper frequency, and the symbol rate will be used to set the coefficients of the passband filter to set the proper passband (assuming a programmable digital passband filter is used), and the amplifier will be enabled and its gain set and the buffer will be enabled and addresses to store the digital samples will be generated. These addresses may be generated in any way and may not be generated by the cable modem in all embodiments.

In alternative embodiments, bursts from all SIDs will be captured. In other alternative embodiments, any process will suffice to practice the invention which: performs upstream training and registers with the CMTS and achieves upstream minislot boundary synchronization with the CMTS through normal DOCSIS protocols; receives data defining which bursts to capture or to capture specified or all upstream transmissions from specified SIDs or IP addresses; listens to registration traffic to learn the SID of each CM in the system; receives UCD and MAP messages and has the capability to search the MAP messages to find the corresponding minislot numbers of authorized upstream bursts from specific SIDs; and which can use the local timestamp counter to generate properly timed control signals for the sniffer burst capture circuitry to capture the designated bursts. One way to generate the proper timing is for the sniffer to fake a MAP that authorizes a transmission during the minislots that map to the burst to be captured and then not actually transmit any upstream data but use signals generated in the transmitter to generate the appropriate timing to generate the control signals necessary to control the burst capture circuitry. In some embodiments, the tuner and programmable gain amplifier can be left on all the time and only the A/D converter and address generation for the buffer is enabled during the upstream minislots corresponding to a burst to be captured.

The embodiments of FIGS. 5 and 6 are sniffer/repeaters. The main difference between these embodiment and the embodiment of FIG. 4 is that in the embodiments of FIGS. 5 and 6, the original upstream burst from the cable modem under test does not get to the CMTS via the upstream medium 152 of the HFC system 86. Instead, all upstream bursts get captured in buffer 120 and then repeated to the CMTS 88 a fixed time delay later via path 150. In other words, every upstream burst on upstream medium 152 is received by tuner 114, amplified by amplifier 116 to maximize the use of the dynamic range of the A/D converter 118, filtered by the programmable digital filter 123 (if used) and stored in buffer 120. A fixed time delay later, the samples of each burst are converted back into an RF signal of the same frequency they originally were and are transmitted to the CMTS on upstream medium 150. In the meantime, the samples of each burst in buffer 120 may be processed or moved to other storage (not shown).

In the embodiment of FIG. 6, all upstream bursts are diverted by diplexer 101 to tuner 114 and are captured in buffer 120. After a fixed delay, the samples of each burst are converted back to RF and transmitted to the CMTS 88 on path 150.

In these embodiments, an additional step is added to the end of FIG. 7 to control the sniffer repeater circuitry (not separately shown) to convert the samples of each burst back into an RF signal of the same frequency of the original burst and re-transmit them on upstream medium 150.

In these embodiments of FIGS. 5 and 6, if a conventional CMTS 88 with burst acquisition circuitry is used, the buffer circuit 120 includes circuitry such as a digital-to-analog converter and digital quadrature up converter (DQU) to convert the samples of the IF signal digitized by A/D converter 118 back into IF signals and then up convert the analog IF signals back to the original radio frequency signals received by tuner 114 which the CMTS will reacquire. These optional circuits are shown in dashed lines as circuits following or part of buffer 120 in FIG. 5 and are present in embodiments like FIG. 6 also which use conventional CMTS receivers 88 although they are not shown in the drawing. The CMTS protocols do not get derailed by this process as long as there is a fixed delay between the time the burst is captured and the time it is repeated. This delay just causes the CMTS to think that the CM that sent each burst is further away from the CMTS than it really is.

In the embodiment of FIG. 5, the upstream medium 152 is disconnected from the CMTS 88 and is connected only to the tuner 114 in the sniffer. In the embodiment of FIG. 6, a diplexer 101 separates the upstream signals on HFC 86 and supplies them on path 103 to tuner 114. Downstream signals from the CMTS enter the diplexer 101 on path 105 and are coupled onto the downstream medium of the HFC system 86. Diplexer 100 couples the upstream path 107 and the downstream path 109 of the cable modem 96 onto the appropriate medium of the HFC system 86. If separate medium for upstream and downstream are not used at the point of the tap 98, then the diplexer uses the different frequencies of the upstream and downstream transmission bands to separate the upstream and downstream traffic and couple each for transmission in the proper direction, and the same is true of diplexer 101.

All other software in the cable modem in the sniffer is conventional.

One important class of embodiments for the sniffers of FIGS. 5 and 6 is for the buffer 120 to not include any circuitry that converts the digital samples of the captured bursts back to analog signals. In this class of embodiments, the CMTS 88 pushes the burst acquisition function out to the optical nodes. In other words, in these embodiments, the normal burst acquisition circuitry in the CMTS 88 (which is a duplicate of the tuner 114, programmable gain amplifier 116, A/D converter 118, programmable filter 123 and buffer 120) is eliminated. This is because its functionality is pushed out to the location of the optical node, so the CMTS only needs the signal processing circuitry that processes the filtered digital samples of each burst. This allows a more efficient use of the CMTS receiver by placing a sniffer at the location of each optical node (or at the CMTS in some embodiments) to capture all upstream bursts as digital samples and send only the digital samples of the captured bursts to the CMTS 88. The CMTS 88 in these embodiments would contain only the signal processing circuitry of a conventional CMTS which is normally located after the burst acquisition circuitry which tunes, filters, digitizes, decimates, and buffers each burst. This arrangement with a sniffer at each optical node would replace the digital return structure of the prior art shown in FIG. 8 with the sniffer based structure of FIG. 9.

Figure 8:
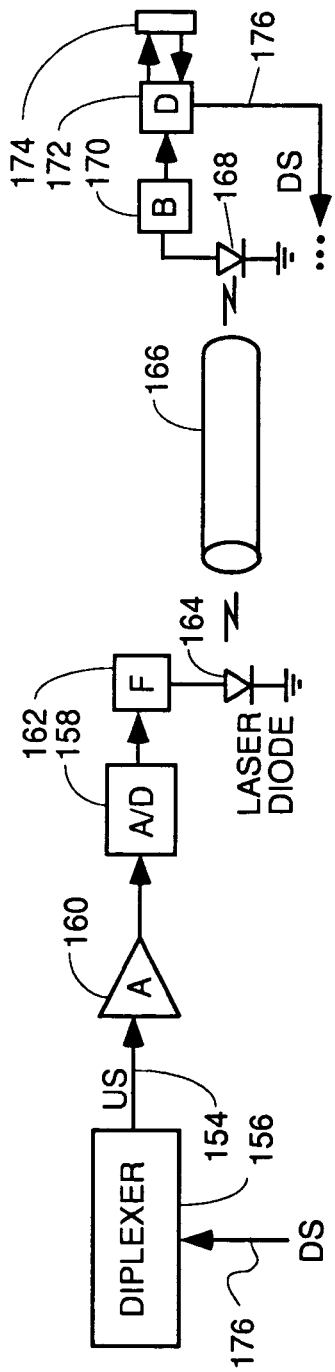
FIG. 8 is a diagram of the prior art digital return structure from the diplexer at the optical node to the CMTS.

The embodiment of FIG. 8 samples all minislots of the upstream on line 154 output by the diplexer 156 at the optical node using an A/D converter 158 which samples the amplified output from amplifier 160 at a high sample rate. All minislots, including empty ones, are sampled by A/D converter 158 and output to a framer 162. The framer outputs bits to a digital laser diode 164 which converts them to light pulses which are carried by optical fiber 166 to a photodetector diode 168 at the head end. A buffer 170 stores the samples, and a diplexer 172 separate the upstream from the downstream and couples the signals from the buffer 170 to a CMTS 174 for the upstream and couples downstream signals from the CMTS 174 to a downstream 176.

Figure 9:
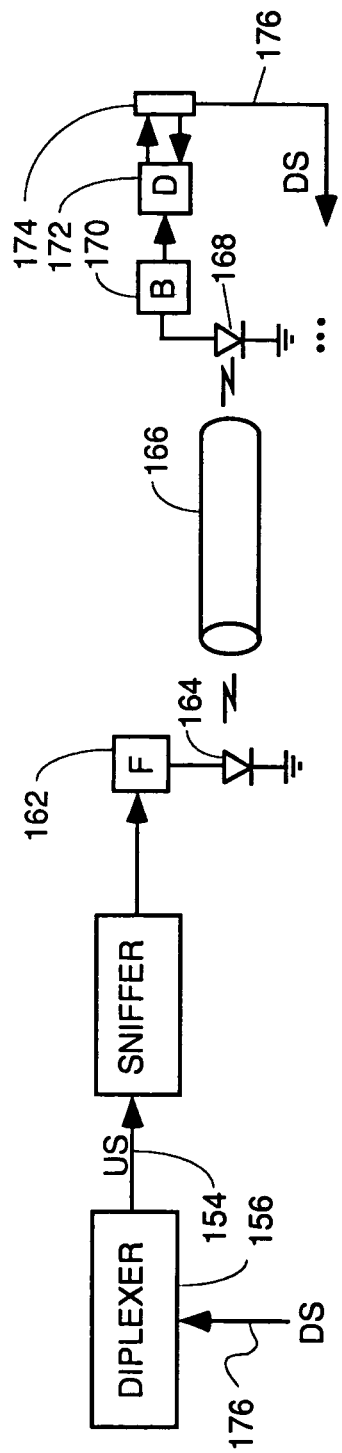
FIG. 9 is a block diagram of a sniffer based digital returne structure from the diplexer at the optical node to the CMTS which captures only the bursts and does not sample empty minislots like the structure in FIG. 8.
Figure 10A:
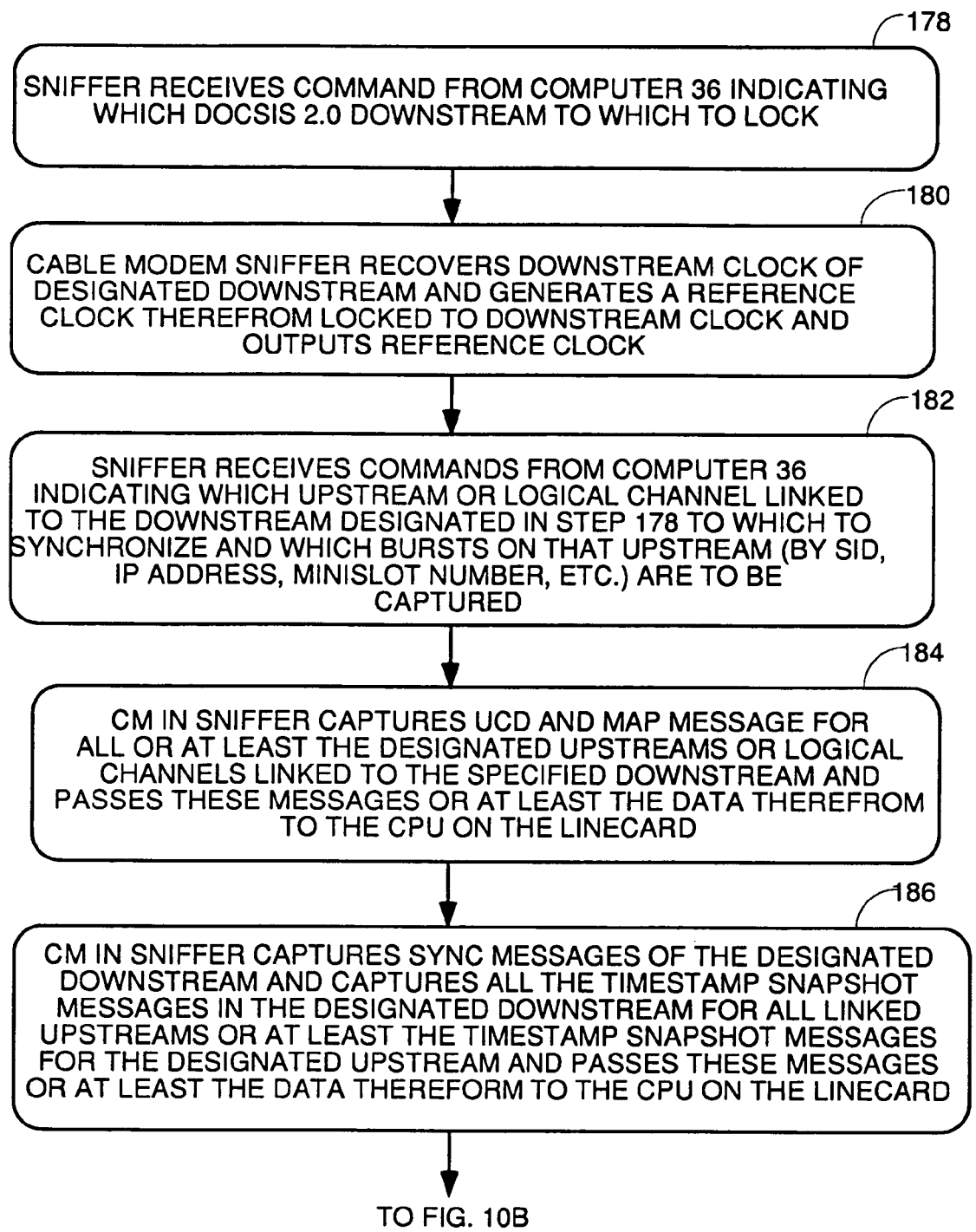
FIGS. 10A, 10B, 10C and 10D are a flowchart of the process for controlling the sniffer of FIGS. 1 or 2 to receive designated downstream and upstream bursts on a downstream and an upstream (or logical channel) designated by a control computer.
Figure 10B:
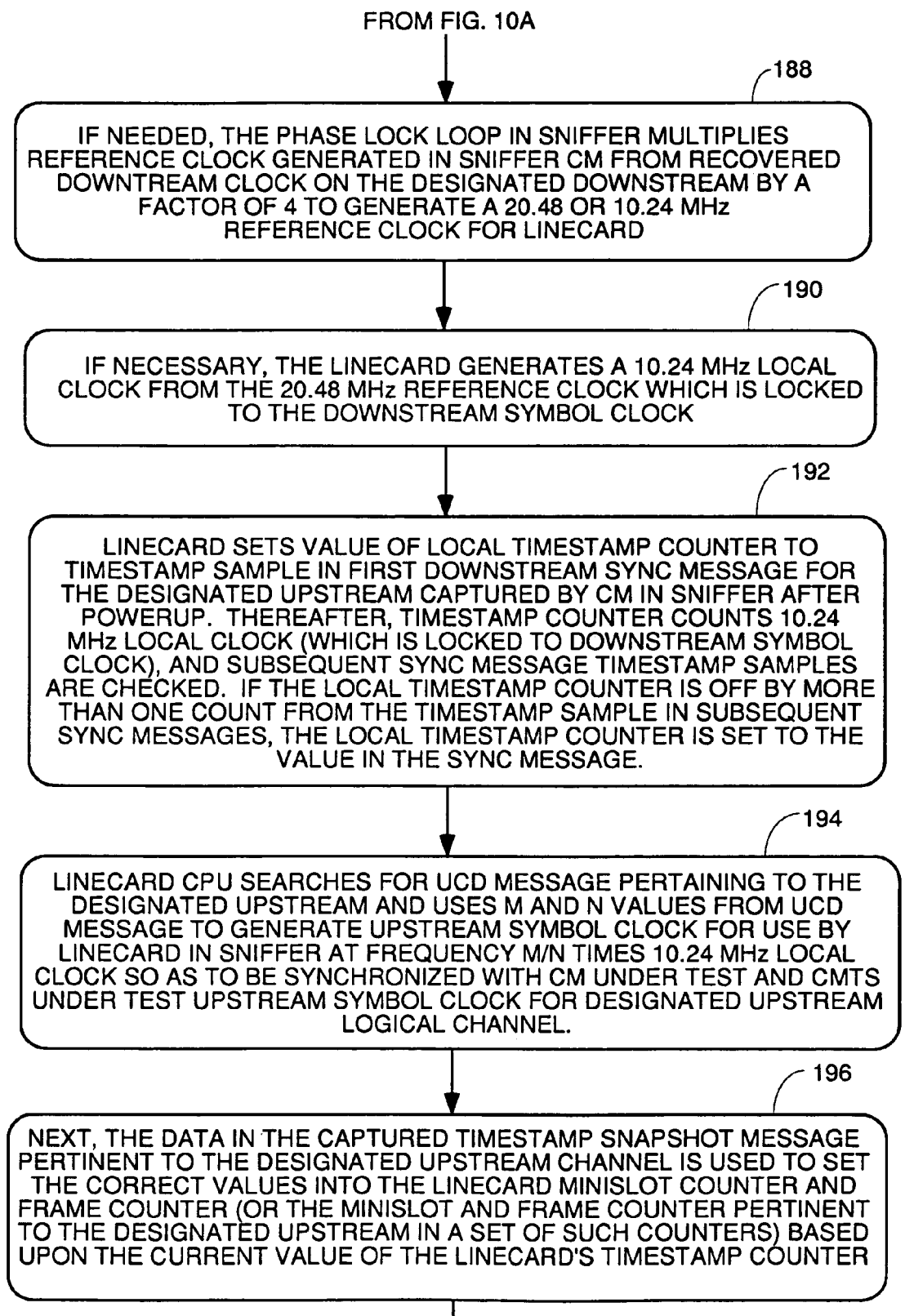
Figure 10C:
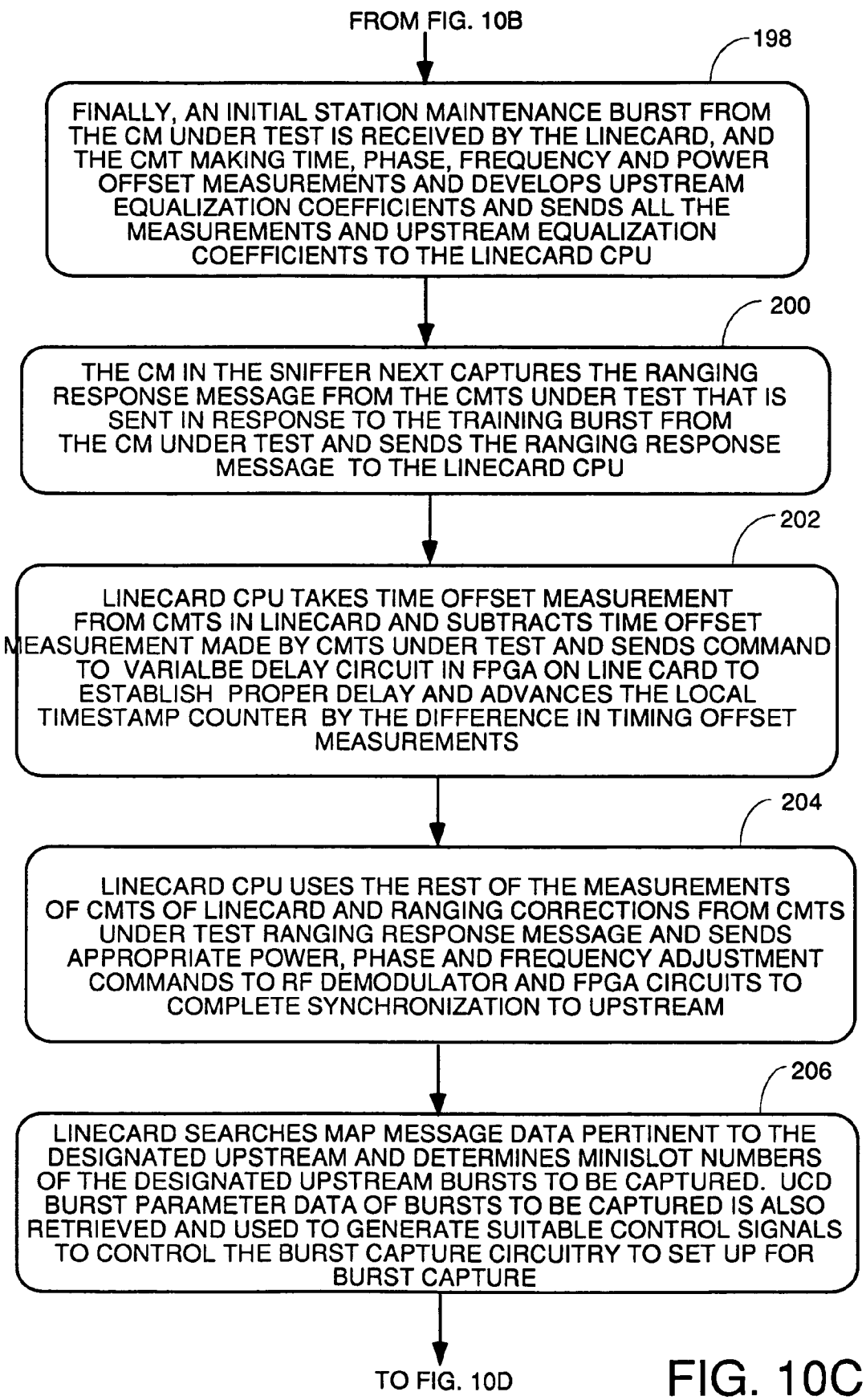
Figure 10D:
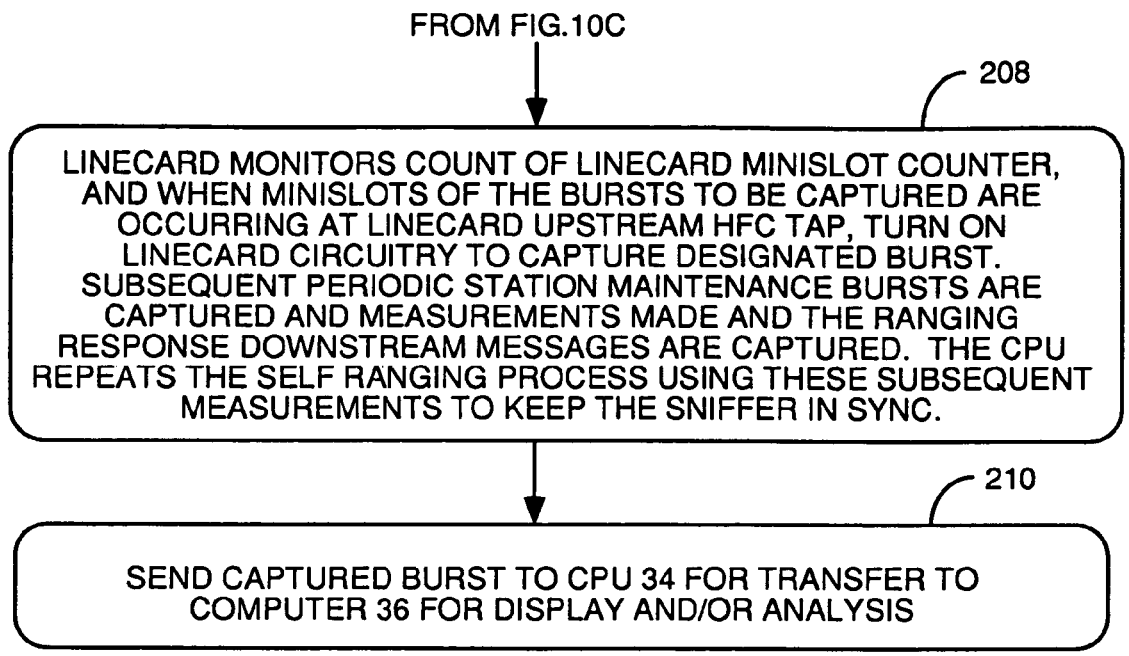

FIG. 9 is a block diagram of a sniffer based digital return structure from the diplexer at the optical node to the CMTS which captures only the bursts and does not sample empty minislots like the structure in FIG. 8. Only the actual bursts on the upstream line 154 from the diplexer 156 are captured in sniffer 178 and empty minslots are ignored. The bursts include the protocol messages so no protocol upsets occur. The sniffer has the structure of either FIG. 5 or FIG. 6. The digital samples of each burst are output from the sniffer 178 to a framer 162 and converted to light pulses by a laser diode 174. From there all the rest of the circuitry is the same. The CMTS 174 does not need any burst acquisition circuitry because that functionality is performed out at the optical nodes.

The advantage of the system of FIG. 9 is that only the bursts are captured and sampled and everything else is ignored. This means that multiple optical nodes can be daisy chained together for maximizing the efficiency of use of the optical fiber 166 and the CMTS 174. The CMTS 174 can be only signal processing circuitry and needs no burst acquisition circuitry (the same is true of FIG. 8 prior art). However, in FIG. 9, the CMTS is used more efficiently than in FIG. 8 prior art because the pipelined stages of CMTS 174 are kept filled with burst data at all times and no pipeline stage is processing samples of empty minislots at any time.

Timebase Search Mode

The linecard CMTS receiver 32 can adjust its timebase using the initial IUC3 training burst of the CM under test if the CM under test 18 has not yet performed initial training. However, if the sniffer is coupled to the upstream medium 14 after the CM under test 18 has performed its initial training, the linecard 26 may be unable to receive the IUC4 periodic station maintenance bursts because its timestamp counter may be too far off to know where the IUC4 window beginning minislot is in time.

To resolve this problem, the operator may elect to reset one of the CMs under test to force the CM to transmit an IUC3 initial station maintenance training burst which will enable the linecard 26 in the sniffer to bet in synchronization.

If the CM under test is not reset, and the linecard is unable to detect an IUC4 periodic station maintenance burst, then the linecard will go into an automatic timebase search mode. In this mode, the linecard changes its timestamp counter setting in a trial and error manner and tries after every iteration to receive and IUC4 periodic station maintenance burst from the CM under test. If an IUC4 burst is successfully received, the timestamp counter can be adjusted properly using the clock offset corrections generated by the CMTS 10 under test from the IUC4 burst. If an IUC4 burst is not received, the operator is notified and must force a reset of the CM 18 under test.

The only modifications that need to be made to the sniffer cable modem and CMTS software in this second genus of sniffers is to use the MAP and UCD data to generate suitable control signals to control the burst capture circuitry to capture upstream bursts at the proper times. In some embodiment, modifications must also be made to receive user input defining which bursts to capture. In other embodiments, no such medication to receive user input need be made since the sniffer captures all upstream bursts.

Although the invention has been disclosed in terms of the preferred and alternative embodiments disclosed herein, those skilled in the art will appreciate possible alternative embodiments and other modifications to the teachings disclosed herein which do not depart from the spirit and scope of the invention. All such alternative embodiments and other modifications are intended to be included within the scope of the claims appended hereto.

What is claimed is:

1. A sniffer configured to capturing DOCSIS (Data Over Cable Service Interface Specifications) bursts transmitted between one or more cable modems (CMs) under test and a cable modem termination system (CMTS) under test via a hybrid fiber coaxial cable system, comprising:
    a sniffer upstream receiver capable of receiving DOCSIS upstream bursts;
    a sniffer cable modem coupled a hybrid fiber coaxial cable (HFC) system by an analog signal path capable of receiving downstream DOCSIS data bursts and messages transmitted by said CMTS;
    a self ranging circuit coupling said HFC cable system to said sniffer upstream receiver, comprising:
        an RF demodulator means for amplifying, filtering and digitizing received radio frequency signals carrying upstream DOCSIS bursts;
        a delay and upstream equalization filter circuit;
    a sniffer clock generator for generating a reference clock signal for said sniffer upstream receiver; and
    a computer coupled to said sniffer cable modem, said sniffer upstream receiver, and said self ranging circuit, for controlling said sniffer cable modem, said sniffer upstream receiver and said self ranging circuit and for receiving data from downstream DOCSIS bursts captured by said sniffer cable modem and for receiving data from upstream DOCSIS bursts captured by said sniffer upstream receiver,
    wherein said linecard comprises;

a computer programmed to receive said commands and generate control signals which control other circuits on said linecard to receive the designated bursts;

a sniffer cable modem coupled to said computer by a data path, for receiving commands from said computer regarding which downstream bursts to capture, and for recovering a downstream symbol clock and using it, directly or indirectly, to capture that designated downstream bursts and messages from a cable modem termination system under test and sending said captured bursts and messages to said computer, and for generating a first clock reference signal which is phase coherent with said recovered downstream symbol clock at least when said sniffer is assigned to capture a DOCSIS 2.0 synchronous code division multiplexed burst;

a sniffer cable modem termination system coupled to said computer for receiving commands from said computer designating which upstream bursts to capture and for using an upstream clock reference signal to synchronize a timebase which generates an upstream symbol clock and upstream minislot to count in such a way as to put said sniffer cable modem termination system in synchronism with an upstream on which the designated upstream bursts will be transmitted and for capturing said designated burst(s) from a cable modem(s) under test;

an RF demodulator circuit coupled to said computer for receiving commands regarding which bursts to capture on which radio frequency carrier signals comprising upstream channels, and functioning, for each such upstream burst to be captured to amplify received radio frequency signals, including the radio frequency signal carrying said burst to be captured, by a gain controlled by a command received from said computer and to filter out at least some unwanted radio frequency signals, and to convert a radio frequency carrier signal carrying said burst to be captured to a predetermined intermediate frequency, and digitizing said radio frequency signal after filtering and conversion to said intermediate frequency into a plurality of digital samples; and means for receiving said plurality of digital samples and imposing a variable delay controlled by a command from said computer and filtering said samples in a digital upstream equalization filter the coefficients of which are controlled by said computer and outputting said filtered samples to said sniffer cable modem termination system for signal processing, wherein said sniffer cable modem is structured and programmed to receive and send to said computer only downstream DOCSIS messages and to recover a downstream clock and generate therefrom an upstream reference clock signal which is phase coherent with said recovered downstream clock, and further comprising a second sniffer cable modem which is coupled to said computer and which is structured and programmed to receive downstream DOCSIS data bursts and transmit data therefrom to said computer, and wherein said sniffer clock generator comprises:

a first multiplexer having a first input coupled to receive said upstream reference clock signal and having a second input coupled to receive a 10.24 MHz reference clock from a CMTS under test, and having an output, and having a control input for receiving a control signal from said computer controlling which reference clock signal is applied to said output;

a phase lock loop for multiplying whichever reference clock signal is output by said first multiplexer by a factor of 2 or 4, as controlled by a control signal from said computer and outputting a 20.48 MHz frequency reference clock signal;

a second multiplexer having a first input coupled to receive said higher frequency reference clock from said phase lock loop, a second input coupled to receive a 20.48 MHz reference clock generated by a CMTS under test, and a third input coupled to receive a 20.48 MHz reference clock generated by said sniffer, and having a control input coupled to receive a control signal controlling which 20.48 MHz clock is supply to an output, and wherein said output is coupled to said sniffer upstream receiver.

2. A sniffer capable of capturing DOCSIS (Data Over Cable Service Interface Specifications) 1.X and DOCSIS 2.0 time division multiplexed bursts and DOCSIS 2.0 synchronous code division multiplexed bursts transmitted between one or more cable modems (CMs) under test and a cable modem termination system (CMTS) under test via a hybrid fiber coaxial cable system (HFC), comprising:

a computer;

a sniffer upstream receiver means for receiving DOCSIS 1.X and DOCSIS 2.0 time division multiplexed bursts and DOCSIS 2.0 synchronous code division multiplexed upstream bursts;

a first sniffer cable modem means coupled to a downstream medium of a hybrid fiber coaxial cable system by an analog signal path, and coupled to said computer by a data path, for recovering a downstream symbol clock and generating an upstream reference clock which is phase coherent therewith, and for recovering data of downstream DOCSIS messages transmitted by said CMTS and transmitting said recovered message data to said computer;

a second sniffer cable modem means coupled to a downstream medium of a hybrid fiber coaxial cable system by an analog signal path, and coupled to said computer by a data path, for recovering data of downstream DOCSIS data bursts transmitted by said CMTS and supplying said data to said computer;

a self ranging means coupling a hybrid fiber coaxial (HFC) cable system to said sniffer upstream receiver means, for processing received upstream DOCSIS bursts so as to enable said sniffer upstream receiver means to receive upstream DOCSIS 1X and DOCSIS 2.0 time division multiplexed bursts and DOCSIS 2.0 synchronous code division multiplexed bursts from each CM coupled to said HFC;

a sniffer clock generator means for receiving said upstream reference clock signal from said first sniffer cable modem means and for using a phase lock loop to filter said upstream reference clock signal and multiply the frequency thereof and supply the resulting upstream reference clock to said sniffer upstream receiver;

and wherein said computer is coupled to said sniffer upstream receiver by a data path and is coupled to said sniffer upstream receiver and said self ranging circuit by a control data path, and is coupled to said first and second cable modem means by a data path, and is programmed to receive downstream data recovered by said first and second sniffer cable modem means, and programmed to control said sniffer upstream receiver meand and said self ranging means and to receive data from upstream DOCSIS bursts captured by said sniffer upstream receiver.

3. A sniffer capable of capturing DOCSIS (Data Over Cable Service Interface Specifications) 2.0 bursts transmitted by one or more cable modems (CMs) under test to a cable modem termination system (CMTS) under test via a hybrid fiber coaxial cable system (HFC), comprising:

a sniffer upstream receiver for using an upstream clock reference signal to synchronize a timebase which generates an upstream symbol clock and upstream minislot count in such a way as to put said sniffer upstream receiver in synchronism with an upstream on which DOCSIS 2.0 synchronous code division multiplexed bursts are being transmitted to a cable modem termination system (CMTS) and allows said sniffer upstream receiver to capture one or more of said bursts from one or more cable modems (CMs) under test;

a sniffer cable modem for recovering a downstream symbol clock and using said recovered downstream symbol clock, directly or indirectly, to receive downstream bursts from a CMTS under test, and for generating a clock reference signal which is phase coherent with said recovered downstream symbol clock when said sniffer is assigned to capture an upstream DOCSIS 2.0 synchronous code division multiplexed burst;

a self ranging circuit comprising:

an RF demodulator means for amplifying a radio frequency carrier signal carrying upstream bursts by a programmable amount of gain in a programmable gain amplifier, filtering said amplified radio frequency carrier signal in a bandpass filter, mixing said filtered radio frequency signal with a local oscillator signal of a programmable frequency to generate an intermediate frequency signal, filtering said intermediate frequency signal in a bandpass filter having a center frequency at said intermediate frequency and having a predetermined bandwidth and digitizing said filtered intermediate frequency signal;

a delay and filter circuit comprising a programmable delay element and a programmable upstream equalization filter functioning to delay said data received from said RF demodulator circuit by a predetermined amount of delay and to filter said data in a digital filter having programmable upstream equalization coefficients;

a sniffer clock generator for using said clock reference signal to selectively generate said upstream clock reference signal so as to be phase coherent with said recovered downstream symbol clock and supply said clock reference signal to said sniffer upstream receiver; and a computer coupled to said sniffer cable modem and to said sniffer upstream receiver, and coupled to said self-ranging circuit, and programmed to receive upstream burst data and messages captured by said sniffer upstream receiver and to receive downstream messages and data captured by said cable modem, and programmed to generate control signals to control said sniffer upstream receiver to define which upstream bursts to capture and to control the circuitry in said upstream receiver to properly receive the IUC burst type(s) of the designated burst(s), and to control:

which downstream radio frequency carrier said cable modem should capture DOCSIS bursts from and which DOCSIS bursts to capture;

a level of gain of said programmable gain amplifier in accordance with a gain offset calculated during a self ranging process;

which upstream radio frequency carrier to receive by controlling the frequency of said local oscillator signal to convert the desired radio frequency carrier to approximately a desired intermediate frequency and using a frequency offset calculated during a self ranging process to correct said frequency of said local oscillator signal to achieve conversion to the precise intermediate frequency desired;

the amount of delay imposed by said programmable delay element; and the upstream equalization coefficients of said upstream equalization filter.

4. The sniffer of claim 3 wherein said sniffer cable modem is structured and programmed to capture downstream messages including UCD, MAP, synchronization, timestamp snapshot, and ranging response messages transmitted downstream by said CMTS to one or more CMs and send said captured downstream messages to said computer, and wherein said sniffer upstream receiver includes a CMTS receiver which is structured and programmed to capture an upstream station maintenance burst transmitted by a CM under test and calculate time, phase, frequency and power offset measurements thereon and develop upstream equalization coefficients therefrom, and wherein said computer is programmed to receive said time, phase, frequency and power offset measurements and said upstream equalization coefficients from said CMTS receiver in said sniffer and derived from said upstream station maintenance burst transmitted by said CM under test, and is further programmed to receive a captured a ranging response message developed by said CMTS under test from the same upstream station maintenance burst transmitted by said CM under test, and wherein said computer is programmed to combine said offset measurements and upstream equalization coefficients developed by said CMTS under test and said CMTS in said sniffer in a predetermined way to develop difference offset measurements and difference upstream equalization coefficients, and wherein said computer is programmed to generate control signals for said self ranging circuit based upon said difference offset measurements and difference equalization coefficients so as to put said sniffer into synchronization with an upstream carrying DOCSIS bursts to be captured.

5. The apparatus of claim 3 wherein said sniffer cable modem comprises a first DOCSIS 2.0 compatible cable modem and a second DOCSIS 2.0 compatible cable modem, each coupled to receive downstream transmissions from said CMTS, and wherein said first DOCSIS 2.0 compatible cable modem is structured and programmed to recover a downstream symbol clock and use said downstream symbol clock to recover only downstream data bursts from said CMTS under test and send the recovered data bursts to said computer, and wherein said second DOCSIS 2.0 compatible cable modem is structured and programmed to recover only downstream DOCSIS messages and send said messages to said computer.

6. The sniffer of claim 3 wherein said sniffer cable modem is structured and programmed to capture downstream messages including UCD, MAP, synchronization, timestamp snapshot, and ranging response messages transmitted downstream by said CMTS to one or more CMs and send said captured downstream messages to said computer, and wherein said sniffer upstream receiver includes a CMTS receiver which is structured and programmed to capture an upstream station maintenance burst transmitted by a CM under test and calculate time, phase, frequency and power offset measurements thereon, and wherein said computer is programmed to receive said time, phase, frequency and power offset measurements from said CMTS receiver in said sniffer and derived from said upstream station maintenance burst transmitted by said CM under test, and is further programmed to receive a captured a ranging response message developed by said CMTS under test from the same upstream station maintenance burst transmitted by said CM under test, and wherein said computer is programmed to combine said offset measurements developed by said CMTS under test and said CMTS in said sniffer in a predetermined way to develop difference offset measurements, and wherein said computer is programmed to generate control signals for said self ranging circuit based upon said difference offset measurements and difference equalization coefficients so as to put said sniffer into synchronization with an upstream carrying DOCSIS bursts to be captured.

7. A sniffer capable of capturing DOCSIS (Data Over Cable Service Interface Specifications) 1.0, DOCSIS 1.1 and DOCSIS 2.0 bursts transmitted by one or more cable modems (CMs) under test to a cable modem termination system (CMTS) under test via a hybrid fiber coaxial cable system (HFC), comprising:
- a port at which commands are received indicating which DOCSIS 1.0, 1.1 and 2.0 upstream and downstream bursts to capture;
- a linecard circuit coupled to said port for capturing the designated upstream bursts and outputting them at said port;
- a cable modem coupled to said HFC and to linecard circuit for recovering a downstream symbol clock and recovering said designated downstream bursts and sending said captured downstream bursts to said linecard for output at said port, and for generating a reference clock signal which is phase coherent with said recovered downstream symbol clock when said sniffer is assigned to capture an upstream DOCSIS 2.0 synchronous code division multiplexed burst; and
- a clock generator for receiving said reference clock signal and generating an upstream clock reference for said linecard circuit which is phase coherent with said reference clock signal when said sniffer is assigned to capture an upstream DOCSIS 2.0 synchronous code division multiplexed burst.

8. The apparatus of claim 7 wherein said linecard circuit includes a computer programmed to receive downstream messages captured by said cable modem and use the content thereof along with measurements and filter coefficients derived by said linecard circuit from captured upstream station maintenance bursts to generate suitable control signals to keep said linecard in synchronism with upstream bursts transmitted by any cable modem under test so as to be able to capture said upstream bursts if said bursts have been designated for capture.

9. A process to capture upstream DOCSIS (Data Over Cable Service Interface Specifications) 2.0 bursts in a sniffer, comprising:
(1) recovering a downstream symbol clock and using it to capture downstream messages transmitted from a cable modem termination system under test, and, if DOCSIS 2.0 synchronous code division multiplexed bursts are to be captured, generating a local upstream reference clock from said recovered downstream symbol clock which is locked to a master clock in said cable modem termination system under test or at least phase coherent with said recovered downstream symbol clock;
(2) using said local upstream reference clock to synchronize a timebase including a local upstream minislot counter in a sniffer to an upstream channel upon which upstreambursts to be captured are transmitted;
(3) performing a self ranging process using captured upstream initial and periodic station maintenance bursts and captured downstream ranging response message data to get a timebase into synchronization with an upstream on which bursts to be captured are transmitted;
(4) using said upstream minislot counter and data in captured downstream messages to capture upstream bursts, possibly including DOCSIS 2.0 synchronous code division multiplexed bursts from a cable modem under test;
(5) receiving commands indicating which upstream bursts to capture, and determining if DOCSIS 1.0 or 1.1 time division multiplexed or DOCSIS 2.0 advanced time division multiplexed bursts are to be captured, and, if so, generating an upstream timestamp count in said sniffer by counting a free running clock having the same frequency as a master clock in a cable modem termination system under test which counts said master clock to generate a master upstream timestamp count, and keeping said upstream timestamp count in said cable codem termination system under test using captured downstream messages which contain samples of said master upstream time stamp count to determine if there is a difference between said master upstream timestamp count and said upstream timestamp count in said sniffer in synchronization with said master upstream timestamp count in said cable modem termination system under test using captured downstream messages which contain samples of said master upstream timestamp count to determine if there is a difference between said master upstream timestamp count and said upstream timestamp count in said sniffer and
(6) searching captured downstream MAP messages for the minislot numbers of bursts to be captured and using MAP message data, an upstream minislot counter is said timebase and captured upstream channel descriptor message data to control a DOCSIS 2.0 compatible cable modem termination system in said sniffer so as to capture designated bursts.

10. The process of claim 9 wherein downstream bursts are captured using first and second DOCSIS 2.0 compatible cable modems in a sniffer which have been modified to capture bursts and messages directed to other cable modems, and using said first cable modem to capture only downstream data bursts and using said second cable modem to capture only downstream messages.

11. A process to capture upstream DOCSIS upstream DOCSIS (Data Over Cable Service Interface Specifications) 2.0 bursts in a sniffer, comprising;
(1) recovering a downstream symbol clock and using it to capture downstream messages transmitted from a cable modem termination system under test, and, if DOCSIS 2.0 synchronous code division multiplexed bursts are to be captured, generating a local upstream reference clock from said recovered downstream symbol clock which is locked to a master clock in said cable modem termination system under test or at least phase coherent with said recovered downstream symbol clock;
(2) using said local upstream reference clock to synchronize a timebase including a local upstream minislot counter in a sniffer to an upstream channel upon which upstream bursts to be captured will be transmitted;

(3) performing a self ranging process using captured initial and periodic station maintenance bursts and captured downstream ranging response message data to get a timebase into synchronization with an upstream on which bursts to be captured will be transmitted;

(4) using said upstream minislot counter and data in captured downstream messages to capture upstream bursts, possibly including DOCSIS 2.0 synchronous code division multiplexed bursts from a cable modem under test; and performing a timebase search when step (3) is performed after a cable modem under test has transmitted an initial station maintenance burst and the timebase is not synchronized sufficiently to enable receipt of a periodic station maintenance burst, said timebase search performed by altering the count of said timestamp counter in said timebase of said sniffer in a trial and error fashion and, after every iteration, attempting to capture a periodic station maintenance burst from a cable modem under test whose upstream burst is to be captured, and if a periodic station maintenance burst is captured, capturing a ranging response message sent by a cable modem termination system under test in response to said captured periodic station maintenance burst and using a time offset correction in said captured ranging response message to alter a count of said timestamp counter in said sniffer timebase, and if no periodic station maintenance burst is captured after any trial and error iteration, generating a message requesting an operator to reset said cable modem under test whose burst is to be captured so as to force said cable modem under test to again transmit an initial station maintenance burst and capturing and processing said initial station maintenance burst to get said timebase in said sniffer into synchronization with an upstream channel upon which said burst to be captured will be transmitted.

12. The process of claim 9 wherein the step of recovering a downstream symbol clock and generating said local upstream reference clock from said recovered downstream symbol clock which is locked to a master clock in a cable modem termination system under test is performed by recovering said downstream symbol clock and using said recovered downstream symbol clock as a reference signal for a phase lock loop which generates said local clock and removes phase noise from said recovered downstream symbol clock.

13. A process to capture in a sniffer downstream DOCSIS (Data Over Cable Service Interface Specifications) bursts and upstream DOCSIS 2.0 synchronous code division multiplexed (SCDMA) bursts and upstream DOCSIS 1.x bursts and DOCSIS 2.0 advanced time division multiplexed (TDMA) bursts, comprising:

(1) recovering in a sniffer a downstream symbol clock and, when DOCSIS 2.0 SCDMA bursts are to be captured, generating an upstream reference clock from said recovered downstream symbol clock which is locked to a master clock in a cable modem termination system (CMTS) or at least phase coherent with said recovered downstream symbol clock, and using said recovered downstream symbol clock to capture downstream bursts and message data;

(2) receiving commands indicating which upstream bursts are to be captured;

(3) when upstream DOCSIS 2.0 synchronous code division multiplexed bursts are to be captured, using said upstream reference clock to synchronize a timebase including a local upstream minislot counter in a sniffer to an upstream upon which bursts to be captured will be transmitted;

(4) when any DOCSIS 1.x or DOCSIS 2.0 burst is to be captured, performing a self ranging process using a captured upstream station maintenance burst from a cable modem under test and captured downstream ranging response message data from a cable modem termination system under test which received the same station maintenance burst captured and processed by said sniffer, and using the difference between offset measurements in said captured ranging response message data and offset measurements developed by said sniffer from said captured station maintenance burst to get into synchronization with an upstream on which bursts to be captured will be transmitted by said cable modem under test which transmitted said station maintenance burst which was processed by said sniffer;

(5) using said local upstream minislot counter and data in captured downstream messages to control a DOCSIS 2.0 compatible cable modem termination system in said sniffer to capture upstream DOCSIS 2.0 synchronous code division multiple access bursts from said cable modem under test;

(6) when upstream DOCSIS 1.x bursts or DOCSIS 2.0 advanced TDMA bursts are to be captured, initializing the count of a local timestamp counter in said sniffer with the value of a timestamp sample of a master timestamp counter in a cable modem termination system (CMTS) under test and contained in a captured downstream synchronization message, and generating a free running local clock which is at the same frequency as a master clock in said CMTS under test, and driving the count input of said local timestamp counter with said local clock;

(7) when upstream DOCSIS 1.x bursts or DOCSIS 2.0 advanced time division multiple access bursts from said cable modem under test are to be captured, using timestamp samples in subsequently captured downstream synchronization messages to verify the count in said local timestamp counter is accurate, and, if the local timestamp count does not match the timestamp sample in said captured synchronization message, using the difference to generate an error signal which is used to alter the frequency of said free running local clock in a direction to reduce the difference, and counting said free running local clock with a local upstream minislot counter so as to track changes in a master upstream minislot counter in said CMTS under test;

(8) using captured MAP message data and the count from said local minislot counter to determine when to turn on upstream burst capture circuitry in said sniffer;

(9) capturing an upstream burst using the timing developed in step (8), and recovering an upstream symbol clock from known preamble data in said captured burst and using said recovered upstream symbol clock to recover data in a data portion of said captured burst.

14. The process of claim 13 further comprising the step of performing a timebase search when step (4) is performed after the cable modem under test has transmitted its initial station maintenance burst and said timebase in said sniffer has not synchronized sufficiently to enable reception of a periodic station maintenance burst from said cable modem under test, said timebase search being performed by altering the count of a timestamp counter in said timebase of said sniffer in a trial and error fashion and, after every iteration, attempting to capture a periodic station maintenance burst from said cable modem under test whose upstream burst is to be captured, and if a periodic station maintenance burst is captured, capturing a ranging response message sent by said CMTS under test in response to reception of the same said periodic station maintenance burst captured by said sniffer, and using a time offset correction in said captured ranging response message to alter the count of said timestamp counter in said sniffer timebase, and if no periodic station maintenance burst is captured after any trial and error iteration, generating a message requesting an operator to reset said cable modem under test so as to force it to retransmit an initial station maintenance burst.

15. A process carried out in a sniffer for capturing upstream DOCSIS (Data Over Cable Service Interface Specifications) 2.0 bursts, comprising the steps:

recovering a downstream symbol clock and generating an upstream reference clock therefrom which is locked to or phase coherent with said downstream symbol clock and using said downstream symbol clock to capture downstream data bursts and messages including Upstream Channel Descriptor (UCD) and MAP messages and synchronization (sync) and timestamp snapshot messages;

using said upstream reference clock to generate a local clock which is locked to a master clock in a cable modem termination system (CMTS) under test that transmitted said downstream bursts and messages where said master clock is used in said CMTS under test to drive a master timestamp counter, setting the initial value of a local timestamp counter to the value of a timestamp sample of a count of said master timestamp counter and included in a captured sync message, and, thereafter, using said local timestamp counter to count cycles of said local clock to track the timestamp count of said master timestamp counter in said CMTS, and using a local minislot counter to count cycles said local clock, and using data in a captured downstream DOCSIS 2.0 timestamp snapshot message to establish the value of said local minislot counter based upon the current value of said local timestamp counter such that the local minislot counter tracks changes of an upstream minislot counter in said CMTS under test;

continuing to check a count of said local timestamp counter against the values of timestamp samples in captured sync messages, and if said local timestamp count is off by more than a predetermined number of counts, setting the value of said local timestamp counter to the value of a timestamp sample in said sync message;

using M and N values from said UCD message to generate an upstream symbol clock at a frequency M/N times the frequency of said recovered downstream symbol clock;

capturing a station maintenance burst from a cable modem under test whose burst is to be captured in a cable modem termination system in said sniffer (sniffer CMTS, and making the same ranging measurements in said sniffer CMTS on said training burst as are made on said training burst by said CMTS under test;

capturing a downstream ranging response messages sent by said CMTS under test in response to receipt of said station maintenance burst, and using the ranging measurements in said captured ranging response message along with the ranging measurements made by said sniffer CMTS to do a self ranging process to control said sniffer so as to put said sniffer into synchronization with upstream transmissions of the cable modem (CM) under test whose upstream burst(s) are to be captured;

searching MAP message data to determine the minislot counts assigned to upstream bursts from said CM under test and using that data along with the count of said local minislot counter to determine when to turn on burst capture circuitry in said sniffer; and using data from said captured UCD messages to determine burst and channel parameters of one or more upstream bursts to be captured from said CM under test, and using said upstream symbol clock and data from said captured MAP and UCD messages to control said sniffer to capture said upstream burst(s) from said cable modem under test.

16. The process of claim 15 further comprising the steps:

when a DOCSIS 1.x or DOCSIS 2.0 advanced time division multiple access burst is to be captured, driving said local timestamp counter in said sniffer with a free running clock having the same frequency as said master clock which drives said master timestamp counter in said CMTS under test;

comparing the timestamp count generated by said local timestamp counter to timestamp samples of the count of said master timestamp counter in said CMTS under test taken from captured downstream sync messages and/or timestamp snapshot messages, and if there is a difference, adjusting the frequency of said free running clock to reduce said difference.

17. A sniffer configure to capturing upstream DOCSIS (Data Over Cable Service Interface Specifications) 1.0, 1.1 and 2.0 bursts comprising:

burst capture circuitry coupled to a hybrid fiber coaxial cable (HFC) system upstream medium which couples a plurality of cable modems (CM) under test to a cable modem termination system (CMTS) under test for exchange of DOCSIS 1.0, 1.1 and 2.0 bursts therebetween; and a cable modem coupled to said DOCSIS compatible cable system upstream and downstream mediums and coupled to said burst capture circuitry, and functioning to register with a cable modem termination system (CMTS) under test as another cable modem in the system, recover a downstream symbol clock and use it to capture downstream messages transmitted by said CMTS under test and extract data therefrom needed to time and control said burst capture circuitry to capture upstream DOCSIS 1.0, 1.1 and 2.0 bursts transmitted from cable modems under test, wherein said cable modem is structured and programmed to perform the following functions:

searching for and locking onto any legitimate DOCSIS downstream;

registering as a cable modem on the system with a said CMTS under test;

receiving a downstream message indicating to which downstream said cable modem should tune and which upstream channel to use, and tuning to said downstream and generating control signals to control the frequency and other channel parameters so upstream transmissions are on the designated channel;

capturing a ranging invitation message;

responding to said ranging invitation message by transmitting one or more station maintenance bursts on the designated upstream channel;

receiving a ranging response message from said CMTS which received said station maintenance bursts and making adjustments in upstream transmit power level, timing, phase and frequency of upstream transmissions in accordance with ranging offset adjustments in said ranging response message, and convolving upstream equalization coefficients in said ranging response message with existing coefficients of an upstream equalization filter in the transmitter of said cable modem to derive new upstream equalization coefficients for use in said filter;

receiving any DOCSIS downstream UCD, MAP, synchronization, timestamp snapshot, ranging request and ranging response messages sent by said CMTS under test;

generating an upstream symbol clock, and, when DOCSIS 2.0 synchronous code division multiple access upstream bursts are to be captured, using said recovered downstream symbol clock to generate said upstream symbol clock such that said upstream symbol clock is phase coherent with said recovered downstream symbol clock;

synchronizing a timebase including an upstream minislot counter and an upstream timestamp counter in said sniffer to the upstream upon which bursts to be captured will be transmitted;

determining which upstream bursts to capture in any way;

using data in captured MAP and UCD messages to generate control signals to control said burst capture circuitry to adapt to channel and burst parameters of DOCSIS bursts to be captured and to capture said upstream DOCSIS bursts determined to be desired for capture.

18. A sniffer capable of capturing upstream DOCSIS (Data Over Cable Service Interface Specifications) 1.0. 1.1 and 2.0 bursts comprising:

burst capture circuitry coupled to a hybrid fiber coaxial cable (HFC) system upstream medium which couples a plurality of cable modems (CM) under test to a cable modem termination system (CMTS) under test for exchange of DOCSIS 1.0, 1.1 and 2.0 bursts therebetween; and a cable modem coupled to said DOCSIS compatible cable system upstream and downstream mediums and coupled to said burst capture circuitry, and functioning to register with a cable modem termination system (CMTS) under test as another cable modem in the system, recover a downstream symbol clock and use it to capture downstream messages transmitted by said CMTS under test and extract data therefrom needed to time and control said burst capture circuitry to capture upstream DOCSIS 1.0, 1.1 and 2.0 bursts transmitted from cable modems under test, wherein said burst capture circuitry comprises:

a tuner having its input coupled to an upstream medium of said HFC;

a programmable gain amplifier coupled to amplify an output signal from said tuner;

an analog-to-digital converter coupled to digitize an output signal from said amplifier, and a buffer to store samples of captured bursts;

and wherein said cable modem is further structured and programmed to control said burst capture circuitry to turn on and capture only designated bursts and to not digitize bursts which are not selected or any signals between bursts where designated bursts may be all bursts on a channel or only specified bursts from one or more specified cable modems under test or only specified types of bursts.

19. The apparatus of claim 18 wherein said tuner in said burst capture circuitry further comprises a mixer to mix a selected upstream channel radio frequency signal down to a predetermined intermediate frequency signal, and a passband filter for filtering out noise outside the band of frequencies which comprise the designated channel interest in said intermediate frequency signal which will carry the burst(s) to be captured.

20. A sniffer capable of capturing upstream DOCSIS (Data Over Cable Service Interface Specifications) 1.0, 1.1 and 2.0 bursts comprising:

a diplexer coupled to upstream and downstream mediums of a hybrid fiber coaxial (HFC) cable system connecting a plurality of cable modems (CM) to a cable modem termination system (CMTS) under test;

a first radio frequency tuner coupled through said diplexer to said downstream medium of said HFC;

a first programmable gain amplifier coupled to amplify an output signal from said first radio frequency tuner;

a digital quadrature upconverter (DQU) having an output coupled through a second programmable gain amplifier and said diplexer to said upstream medium of said HFC;

a cable modem capable of receiving DOCSIS 1.0, 1.1 and 2.0 bursts and having an upstream and a downstream input, said downstream input coupled to said downstream medium of said HFC via a downstream port of said diplexer and said first radio frequency tuner and said first programmable gain amplifier, and said upstream input coupled to said upstream medium of said HFC system via said digital quadrature upconverter and said second programmable gain amplifier and an upstream port of said diplexer, and having a control bus coupled to said DQU and said second programmable gain amplifier, a second radio frequency tuner having an RF input coupled to said upstream medium of said HFC and having an output, and having a control input coupled to said control bus;

a third programmable gain amplifier having an input coupled to said output of said second radio frequency tuner and having an output, and having a control input coupled to control bus;

an analog-to-digital converter means having an input coupled to said output of said third programmable gain amplifier, for converting signals received at said input of said analog-to-digital converter means to a stream of digital samples;

a buffer memory for receiving and storing said samples, and having a control input coupled to said control bus; and wherein said cable modem is structured to perform the following functions:

(1) to lock onto a DOCSIS downstream and generate control signals to control said first radio frequency tuner and said first programmable gain amplifier to switch to another DOCSIS downstream if necessary and provide downstream signals to said cable modem, and carry out processing to conduct initial station maintenance training and periodic station maintenance and to register with said CMTS as a CM on the system;

(2) receive MAP, UCD, synchronization, timestamp snapshot, ranging request and ranging response messages and other downstream messages;

(3) synchronize a timebase having at least an upstream timestamp counter and minislot counter and upstream symbol clock with corresponding counters in said CMTS under test and an upstream symbol clock in each CM under test as a burst from that CM is captured;

(4) determine from the captured MAP messages the upstream minislot counts for bursts from CMs under test to be captured;

(5) use information from captured downstream MAP messages and UCD messages to generate suitable control signals to control said second radio frequency tuner, said third programmable gain amplifier, and said buffer memory to capture digital samples of the desired bursts.

21. The apparatus of claim 20 wherein said cable modem is also structured to receive commands from an external control computer specifying in any way the upstream bursts to be captured and to extract from captured MAP and UCD messages data needed to capture those bursts and to use this data and said timebase to capture the designated bursts.

22. The apparatus of claim 20 further comprising:
means for transmitting captured burst data in said buffer memory as digital samples to an upstream input of said cable modem termination system (CMTS) under test; and
wherein said cable modem is structured and programmed to perform the following additional functions:
control said buffer memory to transmit said captured data burst samples to said means for transmitting a fixed time delay after each burst was captured.

23. The apparatus of claim 20 further comprising means for to convert the digital samples of each captured burst back into radio frequency signals of the same frequency and bandwidth of the original bursts and transmit said radio frequency signals to an upstream input of said CMTS under test.

24. The apparatus of claim 22 wherein said means for transmitting includes a framer to convert digital samples of each burst into one or more frames of digital data which are output to a laser diode which converts each frame of digital signals into light signals which are transmitted via optical fiber to a CMTS which has signal processing circuitry to process the digital samples in each frame.

25. The apparatus of claim 20 further comprising a programmable digital filter means for filtering the digital output samples of said analog-to-digital converter means using a passband which has been programmed to have the bandwidth of the burst to be captured considering the symbol rate of said burst.

26. A sniffer configured to capturing upstream DOCSIS (Data Over Cable Service Interface Specifications) 1.0, 1.1 and 2.0 bursts comprising:
a first diplexer coupled to upstream and downstream mediums of a hybrid fiber coaxial (HFC) cable system connecting a plurality of cable modems (CM) to a cable modem termination system (CMTS) under test;
a first radio frequency tuner coupled through said first diplexer to said downstream medium of said HFC;
a first programmable gain amplifier coupled to amplify an output signal from said first radio frequency tuner;
a digital quadrature upconverter (DQU) having an output coupled through a second programmable gain amplifier and said first diplexer to said upstream medium of said HFC;
a cable modem capable of receiving DOCSIS 1.0, 1.1 and 2.0 bursts and having an upstream and a downstream input, said downstream input coupled to said downstream medium of said HFC via a downstream port of said first diplexer and said first radio frequency tuner and said first programmable gain amplifier, and said upstream input coupled to said upstream medium of said HFC system via said digital quadrature upconverter and said second programmable gain amplifier and an upstream port of said first diplexer, and having a control bus coupled to said DQU and said second programmable gain amplifier;
a second diplexer means having an input coupled to a downstream output of a CMTS under test, and having an input coupled to an upstream medium of said HFC, and having an output, for coupling downstream traffic from said CMTS under test to said downstream medium of said HFC and for diverting upstream transmissions from cable modems under test out said output so they do not reach an upstream input of said CMTS under test directly;
a second radio frequency tuner having an RF input coupled to said output of said second diplexer means for receiving said diverted upstream transmissions, and having an output, and having a control input coupled to said control bus;
a third programmable gain amplifier having an input coupled to said output of said second radio frequency tuner and having an output, and having a control input coupled to control bus;
an analog-to-digital converter means having an input coupled to said output of said third programmable gain amplifier, for converting signals received at said input of said analog-to-digital converter means to a stream of digital samples;
a buffer memory for receiving and storing said samples, and having a control input coupled to said control bus and having an output coupled to an upstream input of said CMTS under test; and
wherein said cable modem is structured to perform the following functions:

(1) to lock onto a DOCSIS downstream and generate control signals to control said first radio frequency tuner and said first programmable gain amplifier to switch to another DOCSIS downstream if necessary and provide downstream signals to said cable modem, and carry out processing to conduct initial station maintenance training and periodic station maintenance and to register with said CMTS as a CM on the system;

(2) receive MAP, UCD, synchronization, timestamp snapshot, ranging request and ranging response messages and other downstream messages;

(3) synchronize a timebase having at least an upstream timestamp counter and minislot counter and upstream symbol clock with corresponding counters in said CMTS under test and an upstream symbol clock in each CM under test as a burst from that CM is captured;

(4) determine from the captured MAP messages the upstream minislot counts for bursts from CMs under test to be captured;

(5) use information from captured downstream MAP messages and UCD messages to generate suitable control signals to control said second radio frequency tuner, said third programmable gain amplifier, and said buffer memory to capture the desired bursts; and (6) control said buffer memory to provide said captured bursts to said upstream input of said CMTS under test.

27. The apparatus of claim 26 wherein said cable modem is also structured to receive commands from an external control computer specifying in any way the upstream bursts to be captured and to extract from captured MAP and UCD messages data needed to capture those bursts and to use this data and said timebase to capture the designated bursts.

28. The apparatus of claim 26 further comprising:
means for transmitting captured burst data to a cable modem termination system (CMTS) upstream input as a digital signal; and
wherein said cable modem is structured and programmed to perform the following additional functions:
control said buffer memory to transmit samples of said captured data bursts to said means for transmitting a fixed time delay after each burst was captured.

29. The apparatus of claim 27 further comprising means for transmitting for converting the digital samples of each captured burst back into radio frequency signals and transmitting said radio frequency signals to an upstream input of said CMTS under test.

30. The apparatus of claim 28 wherein said means for transmitting includes a framer to convert digital samples of each burst into one or more frames of digital data which are output to a laser diode which converts each frame of digital signals into light signals which are transmitted via optical fiber to a CMTS which has signal processing circuitry to process the digital samples in each frame.

31. The apparatus of claim 26 further comprising a programmable digital filter means for filtering the digital output samples of said analog-to-digital converter means using a passband which has been programmed to have the bandwidth of the burst to be captured considering the symbol rate of said burst.

32. A process for using a cable modem to provide timing for upstream burst capture in a DOCSIS (Data Over Cable Service Interface Specifications) 2.0 and DOCSIS 1.x compatible sniffer, comprising the steps:

using a DOCSIS 2.0 compatible cable modem to search for and lock onto a DOCSIS downstream, recover the downstream symbol dock, perform initial and periodic station maintenance and register with a cable modem termination system as a cable modem in the system with DOCSIS 2.0 compatibility;

using a DOCSIS 2.0 compatible cable modem to recover messages including MAP, UCD, synchronization, timestamp sample, ranging request and ranging response messages and use the data therein to get a timebase into synchronization with an upstream on which DOCSIS 1.x and/or DOCSIS 2.0 bursts to be captured will be transmitted in the same way any DOCSIS 1.x compatible or DOCSIS 2.0 cable modem gets into synchronization with an upstream;

using a DOCSIS 2.0 compatible cable modem to read data from captured MAP and UCD messages needed to determine burst and channel parameters and minislot numbers of upstream DOCSIS 1.x and/or DOCSIS 2.0 bursts to be captured; and using a DOCSIS 2.0 compatible cable modem to generate suitable control signals based upon said data from said MAP and UCD messages and information from said timebase to control burst acquisition circuitry in said sniffer to capture said DOCSIS 1.x and/or DOCSIS 2.0 bursts.

* * * * *

UNITED STATES PATENT AND TRADEMARK OFFICE
CERTIFICATE OF CORRECTION

PATENT NO. : 7,362,773 B2
APPLICATION NO. : 10/397508
DATED : April 22, 2008
INVENTOR(S) : Azenko et al.

It is certified that error appears in the above-identified patent and that said Letters Patent is hereby corrected as shown below:

COLUMN 2:
Line 29: Please delete "mininslot" and replace with --minislot--
Line 37: Please delete "DOCSSI" and replace with --DOCSIS--

COLUMN 3:
Line 3: After "and", please delete "an"
Line 56: Please delete "messges" and replace with --messages--

COLUMN 4:
Line 31: Please delete "modificiations" and replace with --modifications--
Line 37: Please delete "modication" and replace with --modification--

COLUMN 5:
Line 22: Please delete "returne" and replace with --return--
Line 56: Please delete "arrary" and replace with --array--

COLUMN 8:
Line 50: Please delete "bandwith" and replace with --bandwidth--
Line 58: Please delete "numberically" and replace with --numerically--

COLUMN 14:
Line 29: Please delete "timeststamp" and replace with --timestamp--

COLUMN 15:
Line 5: Please delete "suppled" and replace with --supplied--

COLUMN 22:
Lines 52-53: Please delete "substracts" and replace with --subtracts--

COLUMN 28:
Line 57: Please delete "localt" and replace with --local--

COLUMN 31:
Line 40: Please delete "minslots" and replace with --minislots--

UNITED STATES PATENT AND TRADEMARK OFFICE
CERTIFICATE OF CORRECTION

PATENT NO. : 7,362,773 B2
APPLICATION NO. : 10/397508
DATED : April 22, 2008
INVENTOR(S) : Azenko et al.

It is certified that error appears in the above-identified patent and that said Letters Patent is hereby corrected as shown below:

COLUMN 32:
Line 28: Please delete "medication" and replace with --modification--

COLUMN 34:
Line 65: In Claim 2, please delete "meand" and replace with --means--

COLUMN 36:
Line 30: In Claim 4, after "captured", please delete "a"

COLUMN 45:
Line 27: In Claim 23, please delete "for to" and replace with --to--

COLUMN 48:
Line 3: In Claim 32, please delete "dock," and insert --clock,--

Signed and Sealed this

Twenty-fifth Day of August, 2009

David J. Kappos
*Director of the United States Patent and Trademark Office*